(12) United States Patent
Thimmannagari et al.

(10) Patent No.: US 7,219,218 B2
(45) Date of Patent: May 15, 2007

(54) VECTOR TECHNIQUE FOR ADDRESSING HELPER INSTRUCTION GROUPS ASSOCIATED WITH COMPLEX INSTRUCTIONS

(75) Inventors: Chandra M. R. Thimmannagari, Fremont, CA (US); Sorin Iacobovici, San Jose, CA (US); Rabin Sugumar, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 551 days.

(21) Appl. No.: 10/403,530

(22) Filed: Mar. 31, 2003

(65) Prior Publication Data

US 2004/0199753 A1   Oct. 7, 2004

(51) Int. Cl.
G06F 9/26 (2006.01)
G06F 9/40 (2006.01)

(52) U.S. Cl. ............... 712/242; 712/243; 712/230; 711/219

(58) Field of Classification Search ............ 712/242, 712/219; 711/219
See application file for complete search history.

(56) References Cited

U.S. PATENT DOCUMENTS

| | | | |
|---|---|---|---|
| 5,438,668 A * | 8/1995 | Coon et al. ............... 712/204 |
| 5,754,812 A | 5/1998 | Favor et al. |
| 5,768,575 A * | 6/1998 | McFarland et al. ......... 712/228 |
| 5,796,973 A | 8/1998 | Witt et al. |
| 5,805,850 A * | 9/1998 | Luick ..................... 712/215 |
| 5,822,555 A * | 10/1998 | Brown et al. .............. 712/204 |
| 5,875,316 A * | 2/1999 | Panwar et al. ............. 712/215 |
| 5,900,018 A * | 5/1999 | Lynch ..................... 711/147 |
| 6,038,657 A | 3/2000 | Favor et al. |
| 6,098,165 A | 8/2000 | Panwar et al. |
| 6,112,282 A | 8/2000 | Lynch |
| 6,173,385 B1 * | 1/2001 | Tuma et al. ............... 711/219 |
| 6,366,998 B1 | 4/2002 | Mohamed |
| 6,658,561 B1 | 12/2003 | Benayoun et al. |
| 6,738,892 B1 | 5/2004 | Coon et al. |
| 6,789,186 B1 | 9/2004 | Brockmann et al. |
| 2003/0229771 A1 | 12/2003 | Thimmannagari et al. |

(Continued)

OTHER PUBLICATIONS

Culler, David. "Hardware-Software Trade-offs in Synchronization and Data Layout". Feb. 17, 1999. Obtained on the web from: http://www.cs.berkeley.edu/~culler/cs258-s99/lec09.pdf.*

(Continued)

*Primary Examiner*—Eddie Chan
*Assistant Examiner*—Robert Fennema
(74) *Attorney, Agent, or Firm*—Darby & Darby PC; M. David Ream

(57) ABSTRACT

The present application describes a method and a system for executing instructions while reducing the logic required for execution in a processor. Instructions (e.g., atomic, integer-multiply, integer-divide, move on integer registers, graphics, floating point calculations or the like) are expanded into helper instructions before execution (e.g., in the integer, floating point, graphics and memory units or the like). Such instructions are treated as complex instructions. The functionality of a complex instruction is shared among multiple helpers so that by executing the helpers representing the complex instruction, the functionality of complex instruction is achieved. The expansion of complex instructions into helper instructions reduces the amount of hardware and complexity involved in supporting these individual complex instructions in various units in the processor.

53 Claims, 7 Drawing Sheets

U.S. PATENT DOCUMENTS

| | | |
|---|---|---|
| 2003/0229772 A1 | 12/2003 | Thimmannagari et al. |
| 2004/0133432 A1 | 7/2004 | Sugumar et al. |
| 2004/0133766 A1 | 7/2004 | Abraham et al. |
| 2004/0133768 A1 | 7/2004 | Thimmannagari et al. |
| 2004/0148496 A1 | 7/2004 | Thimmannagari et al. |
| 2004/0193844 A1 | 9/2004 | Thimmannagari et al. |
| 2004/0193845 A1 | 9/2004 | Thimmannagari et al. |
| 2004/0215941 A1 | 10/2004 | Thimmannagari et al. |

OTHER PUBLICATIONS

Hamacher, Carl. Vranesic, Zvonko. Zaky, Safwat. "Computer Organization". McGraw-Hill Book Company, 2nd edition. 1978. pp. 137-141, 146-158.*

Sakakibara et al. "Scalable Parallel Memory Architecture with a Skew Scheme". Proceedings of the 7th international conference on Supercomputing, 1993. pp. 157-166.*

Kitchen, Andrew, "Class Notes Chapter 8," *Control Structures*, 1994.

Weaver, D. L. and Germond, Tom, "The SPARC Architecture Manual Version 9," SPARC International Inc., 1994. pp. 133-136, 152-153, 227-228, and 263.

* cited by examiner

VECTOR TECHNIQUE FOR ADDRESSING HELPER INSTRUCTION GROUPS ASSOCIATED WITH COMPLEX INSTRUCTIONS

BACKGROUND

1. Field of the Invention

The present application relates to processor architecture, and more particularly to the execution of complex instructions in a processor.

2. Description of the Related Art

Generally, instructions are executed in their entirety in a processor to maintain the speed and efficiency of execution. As the instructions get more complex (e.g., atomic, integer-multiply, integer-divide, move on integer registers, graphics, floating point calculations or the like) the complexity of the processor architecture also increases accordingly. Complex processor architectures require extensive silicon space in the semiconductor integrated circuits. To limit the size of the semiconductor integrated circuits, typically, the functionality the processor is compromised by reducing the number of on-chip peripherals or by performing certain complex operations in the software to reduce the amount of complex logic in the semiconductor integrated circuits.

A method and a system are needed for processors to execute complex instructions in the hardware without increasing the complexity of the processor logic.

SUMMARY

The present application describes a method and a system for executing instructions while reducing the logic required for execution in a processor. Instructions (e.g., atomic, integer-multiply, integer-divide, move on integer registers, graphics, floating point calculations or the like) are expanded into helper instructions before execution (e.g., in the integer, floating point, graphics and memory units or the like). Such instructions are treated as complex instructions. The functionality of a complex instruction is shared among multiple helpers so that by executing the helpers representing the complex instruction, the functionality of complex instruction is achieved. The expansion of complex instructions into helper instructions reduces the amount of hardware and complexity involved in supporting these individual complex instructions in various units in the processor.

Accordingly, in one embodiment, a processor that decodes a plurality of complex instructions and substitutes, for at least some of the plurality of complex instructions, helper instructions retrieved from a helper store. The helper instructions are organized as one or more groups and a vector is utilized to address an initial one of the one or more groups in the helper store, and by shifting the vector, each subsequent one of the one or more groups.

In another embodiment, a method of operating a processor includes retrieving a plurality of instructions, wherein at least one instruction in the plurality of instructions is a complex instruction, and mapping the complex instruction to a set of helper instructions retrievable from a helper store utilizing a vector. The set of helper instructions is organized as one or more groups and the vector is utilized to address an initial one of the one or more groups in the helper store, and by shifting the vector, each subsequent one of the one or more groups.

In another embodiment, a processor includes a helper instruction store configured to store plural sets of helper instructions, each set organized as one or more groups, each set corresponding to a different complex instruction, and a vector generator coupled to the helper instruction store and configured to generate a vector corresponding to a complex instruction to address an initial group in a corresponding set of helper instructions and, by shifting the vector, each subsequent group in the corresponding set of helper instructions.

The foregoing is a summary and thus contains, by necessity, simplifications, generalizations and omissions of detail. Consequently, those skilled in the art will appreciate that the foregoing summary is illustrative only and that it is not intended to be in any way limiting of the invention. Other aspects, inventive features, and advantages of the present invention, as defined solely by the claims, may be apparent from the detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
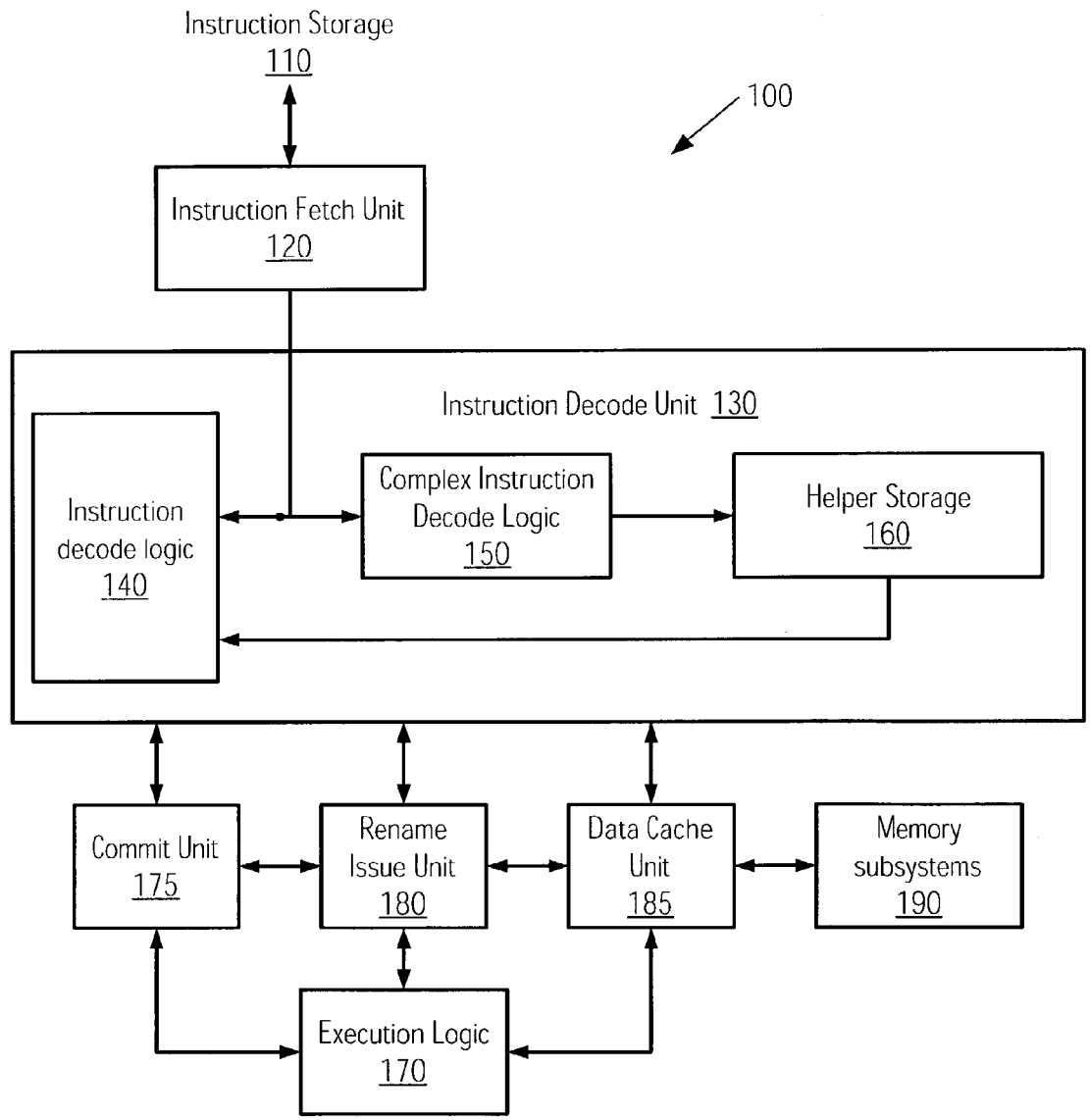
FIG. 1 illustrates an example of a processor architecture according to an embodiment of the present invention.

FIG. 1 illustrates an example of architecture of a processor according to an embodiment of the present invention. A processor 100 accesses an instruction storage 110. Processor 100 can be any processor (e.g., general purpose, out-of-order, very long instruction word (VLIW), reduced instruction set processor or the like). Instruction storage 110 can be any storage (e.g., cache, main memory, peripheral storage or the like) to store the executable instructions. An instruction fetch unit (IFU) 120 is coupled to instruction storage 110. IFU 120 is configured to fetch instructions from instruction storage 110. IFU 120 can fetch multiple instructions in one clock cycle (e.g., three, four, five or the like) according to the architectural configuration of processor 100.

An instruction decode unit (IDU) 130 is coupled to instruction fetch unit (IFU) 120. IDU 130 decodes instructions fetched by IFU 120. IDU 130 includes an instruction decode logic 140 configured to decode instructions. Instruction decode logic 140 is coupled to a complex instruction decode logic 150. Complex instruction decode logic 150 is coupled to a helper storage 160. Complex instruction decode logic 150 is configured to detect complex instructions, decode the instructions and retrieve a group of simple helper instructions ("helpers") from helper storage 160. The detection of a complex instruction can be made using various methods known in the art (e.g., decoding the opcode or the like).

The functionality of a complex instruction is shared among multiple helpers so that by executing the helpers representing the complex instruction, the functionality of complex instruction is achieved. The helpers reduce the amount of hardware and complexity involved in supporting the individual complex instruction in various units of the processor. The decoded instructions including the helpers are forwarded to a Rename Issue Unit (RIU) 180. RIU 180 renames the instruction fields (e.g., the source registers of the instructions or the like), checks the dependencies of instructions. When the instructions are ready to be issued, RIU 180 issues the instructions to Execution Unit (EXU) 170.

EXU 170 includes a Working Register File (WRF) and an Architectural Register File (ARF) (not shown). WRF and ARF can be any storage elements (temporary scratch registers or the like) in various units. For example, for integer processing, integer working register files (IWRF) and integer architecture register files (IARF) are configured. Similarly, for floating point processing, FWRF and FARF are configured and for complex instruction processing, CWRF and CARF are configured. EXU 170 executes instructions and stores the results into WRF. EXU 170 is coupled to a Commit Unit (CMU) 175. CMU 175 monitors instructions and determines whether the instructions are ready to be committed. When an instruction is ready to be committed, CMU 175 writes the associated results from WRF into ARF. The functions of RIU, WRF, ARF and CMU are known in art. A Data Cache Unit (DCU) 185 is further coupled to various units of processor core 100. DCU 185 can include one or more Load Queues (LQ) and Store Queues (SQ). LQs and SQs are typically configured to manage load and store requests. DCU 185 is coupled a memory sub-system 190. While for purposes of illustration, in the present example, various coupling links are shown between various units of processor 100 however one skilled in the art will appreciate that the units can be coupled in various ways according to the functionality desired in the processor.

Typically, DCU 185 manages requests for load/store of data from/to memory storage while monitoring the data in appropriate cache units. DCU 185 performs load/store bypass after comparing the physical addresses of load and store destinations. DCU 185 can be coupled to various elements of the processor to provide appropriate interface to the caches and memory storage. The load requests are stored in load queue whereas the store requests are stored in load and store queues. To maintain a total store order (TSO), DCU 185 processes the store requests in the order that they are received. IDU 130 assigns a load queue identification (LQ_ID) to respective loads and stores including helper instruction loads/stores and assigns the store queue identification (SQ_ID) to respective stores including helper store instructions. These ID's are used by DCU 185 to index into its load queue(LQ) and store queue(SQ) structure for update. For example, a load with LQ_ID of 2 when issued to LQ is stored in entry 2 of LQ structure. The respective queue identifications are used to determine the age of the corresponding instruction.

Figure 2:
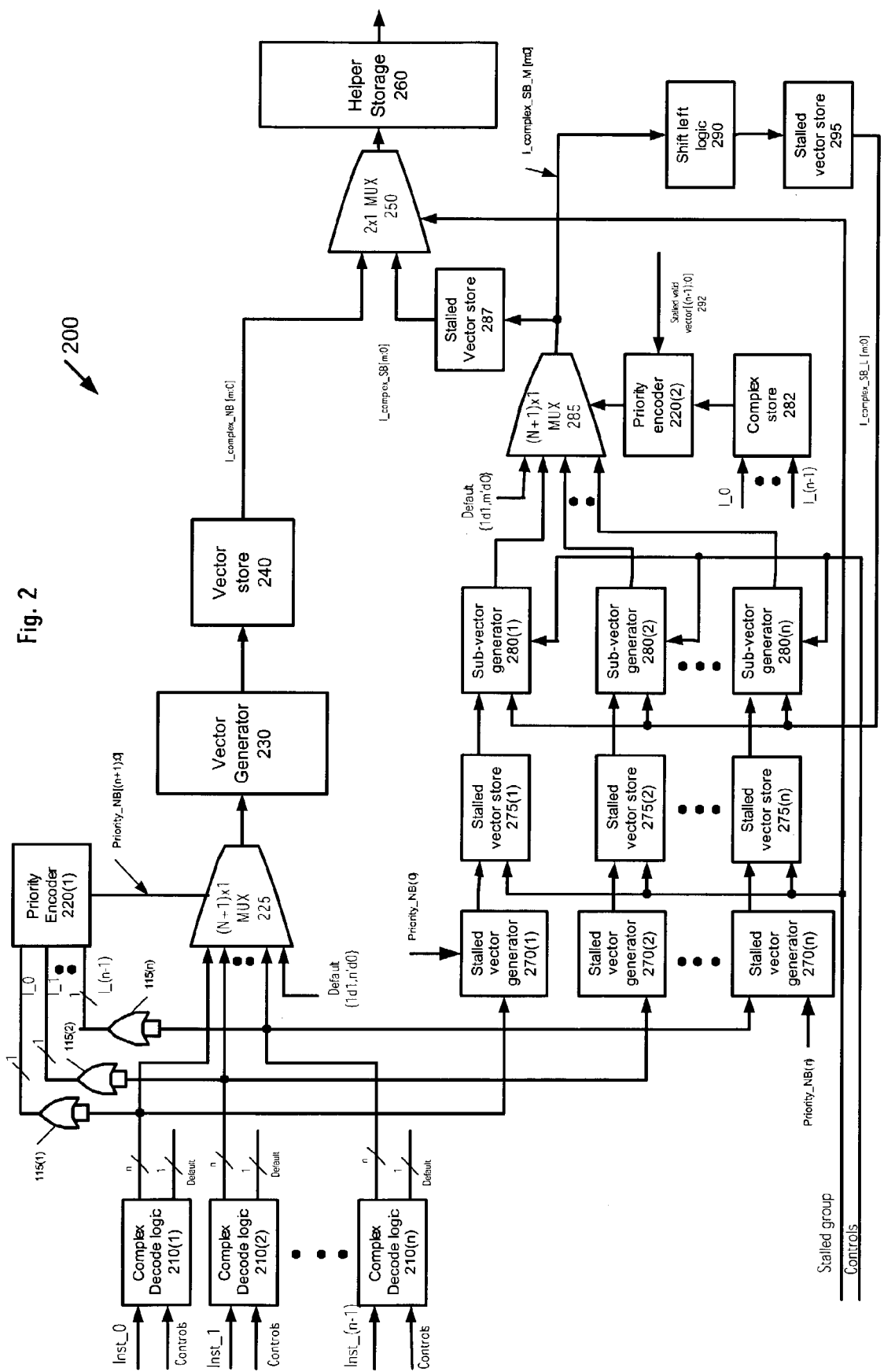
FIG. 2 illustrates an example of an architecture of a complex instruction logic according to an embodiment of the present invention.

FIG. 2 illustrates an example of complex instruction logic 200 according to an embodiment of the present invention. Complex instruction logic 200 includes 'n' complex decode logics 210(1)–(n). Complex decode logics 210 decode complex instructions to determine the operation desired (e.g., atomic, integer-multiply, integer-divide, move on integer registers, graphics, floating point calculations, block load, double word load, double word store and the like). The total number of complex decode logics 210 in the complex instruction logic 200 depends upon the number of instructions that can be fetched in one cycle. For example, if a processor's pipeline is configured to fetch three instructions in one cycle then the complex instruction logic 200 can include three complex decode logics 210(1)–(3). Each of complex decode logics 210 is configured to decode 'n' complex instructions as determined by the architecture of a given processor and generate an output on one of the corresponding 'n' output bits.

The lower 'n' bits of the output of each complex decode logic is 'ORed' using corresponding logic OR gates 115(1)–(n). OR gates 115 provide one bit output to be used by a priority encoder 220(1). Priority encoder 220(1) determines the priority of the instructions. Priority encoder 220(1) can be any priority encoder, known in the art, configured to prioritize inputs based on predetermined priority. In the present example, the priorities of instructions are determined based on the oldest instruction, which is complex, in the fetched group. The oldest complex instruction has the highest priority. For purposes of illustration, in the present example, instruction, which is complex, with the lowest number has the highest priority. For example, instruction Inst_0, if complex, has higher priority than Inst_1 and instruction Inst_2 and Instruction Inst_1 has higher priority than instruction Inst_2 and so on.

According to one embodiment of the present invention, an instruction priority unit is configured to prioritize a plurality of complex instructions according to an order in which the plurality of complex instructions are retrieved in a plurality of instructions and generate a bit address encoding to address a corresponding set of helper instructions in the helper instruction store, the corresponding set of helper instructions corresponding to a highest priority complex instruction of the plurality of complex instructions. According to another embodiment of the present invention, the vector represents word address encoding for the helper instruction store.

An (N+1)×1 multiplexer (MUX) 225 is coupled to decode logics 210. MUX 225 selects one out of 'n+1' inputs based on the priority of the instructions determined by priority encoder 220(1). In the present example, each complex decode logic also generates a default output bit to compensate for a default case at MUX 225 however one skilled in the art will appreciate that complex decode logic can be configured to generate any number of default output as determined by the instruction set of the given processor. The default case can represent any predetermined opcode and generate corresponding default helpers (e.g., no-operations, illegal instruction or the like). In the present example, the default case is represented by {1'd1, n'd0} in which one bit is set to digital 'one' and 'n' bits are set to digital 'zero'. One skilled in the art will appreciate that any convention (e.g., zero, one or the like) or combination thereof can be used to represent the default case.

MUX 225 selects one of (n+1) inputs based on the priority of the instruction. MUX 225 is coupled to a vector generator 230. Vector generator 230 generates a vector representing the storage address for helper instructions ("helpers") for the complex instruction according to a process explained later. Vector generator 230 is coupled to a vector storage 240. Vector storage 240 stores the vector generated by vector generator 230 and processes to generate sub-vectors, if needed, to retrieve helpers as explained later. Vector storage 240 can be any storage element (e.g., flops or the like).

Generally, when instructions are fetched by instruction fetch unit (e.g., IFU 120 or the like), the instructions are decoded by instruction decode unit (e.g., IDU 130 or the like) and processed for execution according to the processor's clock cycles. However, IDU 130 requires additional clock cycles to generate helpers for the complex instruction. Typically, in a pipelined architecture, instructions are fetched in every clock cycle. Thus, by the time IDU 130 recognizes a complex instruction in a first group of fetched instructions, a second group of instructions is already fetched by IFU 120. In such cases, IDU 130 must also receive the second group of fetched instruction. After recognizing a complex instruction in the first group, IDU 130 informs IFU 120 (e.g., via control signals or the like) to stop fetching more instructions.

IDU 130 considers the first group of fetched instructions as the 'stalled' group and the second group of fetched instructions as the 'new group'. The stalled group of instructions is simultaneously processed by respective vector generators 270(1)–(n) and stored in respective stalled vector storage 275(1)–(n). Stalled vector storages 275(1)–(n) store the respective vectors upon receiving a control signal 'stalled group' from IDU 130. When IDU 130 recognizes a complex instruction in the first group of fetched instructions, IDU 130 generates the stalled group control signal to store the vectors generated by stalled vector generators 270(12)–(n).

Each complex instruction can be translated into various numbers of 'helpers'. The number of helpers for a complex instruction depends upon the functionality of the complex instruction. For example, some complex instructions may require two helpers and other complex instructions may require five or more helpers. The helpers are stored in a helper storage 260 and are retrieved from helper storage 260 according to the fetch cycle of the processor. For example, if the processor is configured as three instruction fetch cycle then a group of three helpers can be fetched from helper storage 260 in every cycle. If a complex instruction includes more helpers than can be fetched in one cycle then that complex instruction is considered to include multiple fetched groups of helpers thus requiring more than one cycle to fetch all the helpers needed to accomplish the functionality of the complex instruction.

When IDU 130 decodes a complex instruction, IDU 130 also determines the number of helpers required for the complex instruction. When IDU 130 determines that a complex instruction requires more helpers than can be fetched in one cycle, IDU 130 generates control signal to fetch multiple groups of helpers. IDU 130 provides the control signal to respective Sub-vector generators 280(1)–(n). Sub-vector generators 280(1)–(n) generate respective addresses for helper storage 260 to retrieve helpers in multiple cycles. A (N+1)×1 multiplexer 285 selects the vectors from the oldest instruction as determined by a priority encoder 220(2). Priority encoder 220(2) is similar to priority encoder 220(1) and selects the priority based on the 'age' of the instruction. Priority encoder 220(2) receives instructions from a complex store 282. Complex store 282 can be any storage unit (e.g., flops, memory segment or the like) to store corresponding output bits of OR gates 115(1)–(n). Priority encoder 220(2) is controlled by a stalled valid vector signal 292 generated by IDU 130. IDU 130 can generate stalled valid vector signal 292 upon recognizing a complex instruction in the 'stalled group' of fetched instructions.

MUX 285 also receives a default input, {1' d1, m'd0}, for the default case as explained herein. The output of MUX 285 is a stalled instruction vector I_complex_SB_M[m:0] which is stored in a vector store 287. A 2×1 Multiplexer 250 selects a vector for helper storage 260 upon a select signal from IDU 130. For example, if there is a stalled group of instructions then IDU 130 first selects instructions from the stalled group and then instructions from the new group. Based on the vectors provided, corresponding helpers are retrieved from helper storage 260 for the complex instruction.

The number of helpers per complex instruction can vary according to the function of the complex instruction. Some complex instructions may require more helpers than can be fetched in one clock cycle from the helper storage. In such cases, sub-vectors are generated using the initial vector for a complex instruction. Sub-vectors provide addresses for helper storage during the following clock cycles until all of the helpers are retrieved from the helper storage. According to some embodiments of the present invention, a shift-left method is used to generate consecutive sub-vectors to retrieve helpers from the helper storage. A shift left logic 290 is coupled to the output of MUX 285. A stalled vector store 295 stores the left shifted vector. The output of stalled vector store 295 is coupled to the input of sub-vector generators 280. The sub-vector generators 280 generate the next sub-vector in the next clock cycle to retrieve the next group of helpers. For purposes of illustration a shift-left logic is shown. However, one skilled in the art will appreciate that the sub-vectors can be generated using various other means (e.g., shift-right, shift multiple bits or the like).

According to one embodiment of the present invention, a vector generator may be configured to shift the vector left by one bit location to address in the helper store each subsequent one of the one or more groups. According to another embodiment of the present invention, the vector generator may be configured to shift the vector left by N bit locations to address in the helper store each subsequent one of the plurality of groups wherein N is selected according to address encoding of the helper store.

Figure 3:
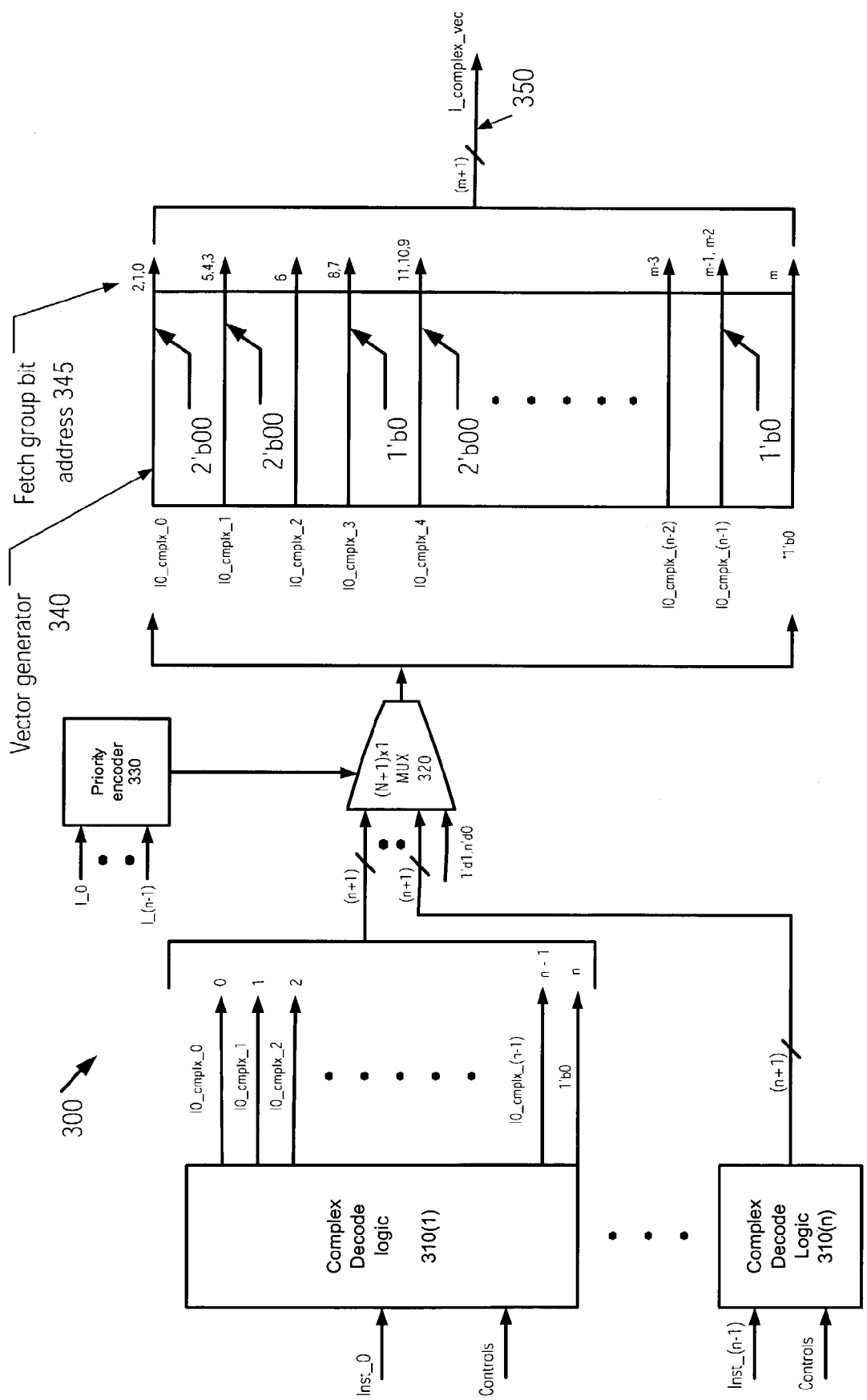
FIG. 3 illustrates an example of a combination of a complex decode logic and a vector generator according to an embodiment of the present invention.

FIG. 3 illustrates an example of a combination of a complex decode logic and a vector generator in a processor 300 according to an embodiment of the present invention. IDU 130 forwards the instruction to complex decode logic 310. The number of complex decode logic can depend upon the number of instructions that can be fetched in a cycle. For example, if a processor is configured to fetch three instructions in a cycle then there can be three complex instructions in a fetch group thus requiring three complex decode logic. For purposes of illustration, in the present example, a given processor 300 is configured to fetch 'n' instructions, instruction Int_0—instruction Inst_(n−1), in one cycle.

IDU 130 forwards instructions in the fetch group to complex decode logic 310. For example, instruction Inst_0 is forwarded to complex decode logic 310(0) and instruction Inst_(n−1) is forwarded to complex decode logic 310(n) and so on. IDU 130 provides controls for complex decode logic 310 to decode the complex instruction. Complex decode logic 310 decodes and generates output representing the complex instruction. The number of outputs of complex decode logic 310 depend upon the number of complex instructions supported by a given processor 300 plus one. The additional output bit is to compensate for the default case as explained herein. The additional output bit can be configured to represent desired output (e.g., hardwired to a digital zero, one or the like). For example, if instruction Inst_0 is a complex function I0_cmplx_2 (e.g., block load, block store or the like) then complex decode logic 310(1) generates an output (e.g., a zero, one or the like) on output bit 2. Similarly, any input instruction can be decoded by respective complex decode logic to generate output on appropriate output bit representing the complex function. For purposes of illustration, in the present example, one configuration of complex decode logic is shown. However, one skilled in the art will appreciate that complex decode logic can be configured using any appropriate logic (e.g., hardwired logic, programmable logic arrays, application specific integrated circuits, programmable controller or the like).

The outputs of complex decode logics 310(1)–(n) are coupled to a (N+1)×1 multiplexer (MUX) 320. MUX 320 selects one of the N+1 inputs based on the priority determined by a priority encoder 330. Priority encoder can be any priority encoder (e.g., hardwired, programmable or the like) which prioritizes instructions based on the 'age'. For example, if Inst_0 and Inst_1 are both complex and both instructions are presented to MUX 320 then the priority encoder 330 selects instruction Inst_0 because Inst_0 is older than Inst_1, i.e., Inst_0 was fetched before Inst_1. The decoded complex instruction is forwarded to a vector generator 340. In the present example, vector generator 340 is configured as a bit alignment logic that generates addresses representing one or more locations in a helper storage in which the helpers for the decoded complex instruction are stored. While for purposes of illustration, in the present example, vector generator 340 is configured as bit alignment logic however one skilled in the art will appreciate that vector generator can be configured using any logic (e.g., hardwired, programmable, application specific or the like) as required by the addressing scheme of helper storage.

Vector generator 340 generates select addresses for helper storage according to the number of fetch groups in each complex instruction. For example, if processor 300 is configured to fetch three instructions in a cycle then up to three helpers can be retrieved from the helper storage in one cycle. Thus, if a complex instruction includes up to three helpers then one bit address vector can be sufficient to retrieve all the helpers from the helper storage. However, if a complex instruction includes more helpers than can be fetched in one cycle (e.g., more than three in the present example) then more than one address vectors can be required to fetch all the helpers corresponding to that complex instruction.

For purposes of illustration, in the present example, processor 300 is configured as three instruction fetch group i.e. three instructions can be fetched in one cycle. Further, instruction Inst_0 can be decoded as 'n' complex instructions I0_cmplx_0 to I0_cmplx_(n−1). Each complex instruction requires one or more fetch groups to retrieve corresponding helpers from the helper storage. The numbers of fetch groups required for each complex instruction in the present example are shown in table 1A.

TABLE 1

Number of fetch groups required for each complex instruction in the present example.

| Complex Instruction | Number of fetch groups required |
|---|---|
| I0_cmplx_0 | 3 |
| I0_cmplx_1 | 3 |
| I0_cmplx_2 | 1 |
| I0_cmplx_3 | 2 |
| I0_cmplx_4 | 3 |
| . | . |
| . | . |
| . | . |
| I0_cmplx_(n−2) | 1 |
| I0_cmplx_(n−1) | 2 |

According to table 1A, in a three instruction fetch group configuration, vector generator 340 generates the first access vector for the helper storage representing three fetch groups for complex instruction I0_cmpls_0 (e.g., at least seven helpers), three fetch groups for complex instruction I0_cmplx_1 (e.g., at least seven helpers), two fetch groups for complex instruction I0_cmplx_2 (e.g., at least four helpers) and so on. In the present example, vector generator 340 is configured as bit alignment logic and complex instruction I0_cmplx_0 requires three fetch groups thus vector generator 340 expands bit zero out of complex decode logic 310(1), representing complex instruction I0_cmplx_0, into three bits, bits 2,1,0 with '0' being the least significant bit. For example, if instruction Inst_0 is decoded as complex instruction I0_cmplx_0 then output bit zero of complex decode logic 310(1) will be set to a 'one' and remaining bits, bits 2–n, will be set to zero (or vise versa).

The 'n+1' bits output of complex decode logic 310(1) is expanded by vector generator 340 into 'm+1' fetch group bit address 345 representing the total number of fetch groups in the helper storage according to the number of fetch groups for each complex instruction plus one for the default case. Thus, in the present example, vector generator 340 expands input bit zero, representing complex instruction I0_cmplx_0, into three bits, bits 2,1 and 0 representing '001'. Input bit zero, representing a one, is expanded into three bits by adding two bits representing '00'. Similarly, complex instruction I0_cmplx_1 is expanded into three bits, bits 5,4,3, complex instruction I0_cmplx_2 is forwarded as one bit, bit 6, complex instruction I0_cmplx_3 is expanded into two bits, bits 8,7, by adding a bit representing zero and so on.

In the present example, complex instruction I0_cmplx_0 is represented by a 'm+1' bits vector I_complex_vec 350 with least significant bit set to 'one' and remaining bits set to 'zero' (or vise versa). The 'm+1' bits vector is used to generate address for the helper storage to retrieve all the corresponding helpers for complex instruction I0_cmplx_0. While for purposes of illustration, in the present example, a bit alignment logic is shown to generate address vector for helper storage however one skilled in the art will appreciate that vector generator 340 can be configured using any logic (e.g., programmable logic, programmable controller or the like). For example, vector generator 340 can be configured as a programmable logic to manipulate the number of fetch groups in each complex instruction thus the corresponding helpers in the helper storage can be programmed to represent the changes in the vector generator. Similarly, the vector generator can be configured as a programmable microcontroller to independently decode complex instruction and generate corresponding helpers. While hardwired logic, such as shown and described here, increases the speed of instruction execution, programmable logics can be used in applications where the speed of instruction execution is not a priority. When a complex instruction includes helpers requiring more than one cycle to be retrieved from the helper storage then IDU 130 provides controls to sub-vector generator 280 to generate sub-vectors for all the fetch groups in the helper storage. IDU 130 also provides additional controls to ensure all the helpers are fetched from the helper storage for a given instruction.

Sub-Vector Generation

For purposes of illustration, in the present example, the sub-vectors are generated using shift left logic however, one skilled in the art will appreciate that sub-vectors can be generated using any mean (e.g., preprogrammed storage, address generators or the like). Referring to FIG. 3, in the present example, complex instruction Inst_0 is decoded by complex decode logic 310(1) as complex function I0_cmplx_0. Complex function I0_cmplx_0 has three helper groups thus vector generator 340 extends I0_cmplx_0 into a three bit fetch group address '001'. Initially, the output of vector generator 340, I_complex_vec, is {(m−2)'d0, 3b001} representing (m−2) most significant bits set to zero and three least significant bits set as '001'.

Referring to FIG. 2, I_complex_vec '001' is stored in vector store 240. Stalled vector generator 270(1)–(n) can include a shift left logic, bit alignment logic and a selector. The control to the selector in the stalled vector generator 270 is one of the bits of Priority_NB[(n+1):0]. In the current example where Inst_0 is decoded as complex instruction I0_cmplx_0 and there are no other complex instructions in the fetch group then the output of 270(1) will be {(n−2)'d0, 3'b010}, the output of 270(2) will be (n+1)'d0 and that of 270(n) will be (n+1)'d0. So the values that gets stored in 275(1), 275(2) and 275(n) are {(n−2)'d0, 3'b010}, (n+1)'d0 and (n+1)'d0 respectively. During the second clock cycle of Inst_0 processing, I_complex_NB (output of vector store 240) '001' is selected by MUX 250 and word line 001 in helper storage 260 is selected for first helper group and because in the present example, Inst_0 has three helper groups, MUX 285 selects I0_complex_vec {(n−2)'d0, 3'b010} and it is stored in stalled vector store 287. Because Inst_0 is one of previously fetched group of instructions (stalled group), the output of stalled vector store 287 is referred to as I_complex_SB. Based on the select from IDU 130 for stalled group, MUX 250 selects I_complex_SB for helper storage and word line '010' in helper storage 260 is selected for second helper group in the third clock cycle of Inst_0 processing. I_complex_SB_M is left shifted by shift left logic 290 and stored in stalled vector store 295. After the left shifting, the three least significant bits of I_complex_SB is set to '100'. In the following clock cycle (i.e., the third clock cycle of instruction I_0 processing), sub-vector generator selects left shifted I_complex_SB_M (i.e. I_complex_SB_L) and word line '100' is selected from helper storage 260 for the third helper group in the fourth clock cycle of Inst_0 processing. When all the helper groups are fetched from helper storage 260, the priority is shifted to the next oldest complex instruction (e.g., Inst_1). In the case of resource stall (e.g., not enough registers or the like) IDU 130 generates appropriate control signals so that the appropriate word addresses are generated by the complex instruction logic (200) to access the helper storage 260.

IDU 130 tracks the number of helper groups for each complex instruction and provides controls accordingly to select appropriate instruction and vector (or sub-vector) to fetch helper group from the helper storage. IDU 130 can provide controls to priority encoders to enable and disable the validity of an instruction. For example, when all the helper groups for Inst_0 are fetched from the helper storage, IDU 130 can provide an invalid signal for Inst_0. Each control signal can be logic ANDed with the instruction.

One skilled in the art will appreciate that while for purposes of illustration, a shift left logic is shown after the vector has been selected by MUX 285 however, the shift left logic can be used at any stage. For example, sub-vector generator can include a combination of shift left logics and selectors, IDU 130 control signals can also be configured accordingly to select appropriate vector for helper storage to fetch groups of helpers. Similarly, the logic can be reversed to use right shifting of the vector to generate appropriate addresses for helper storage.

Figure 4:
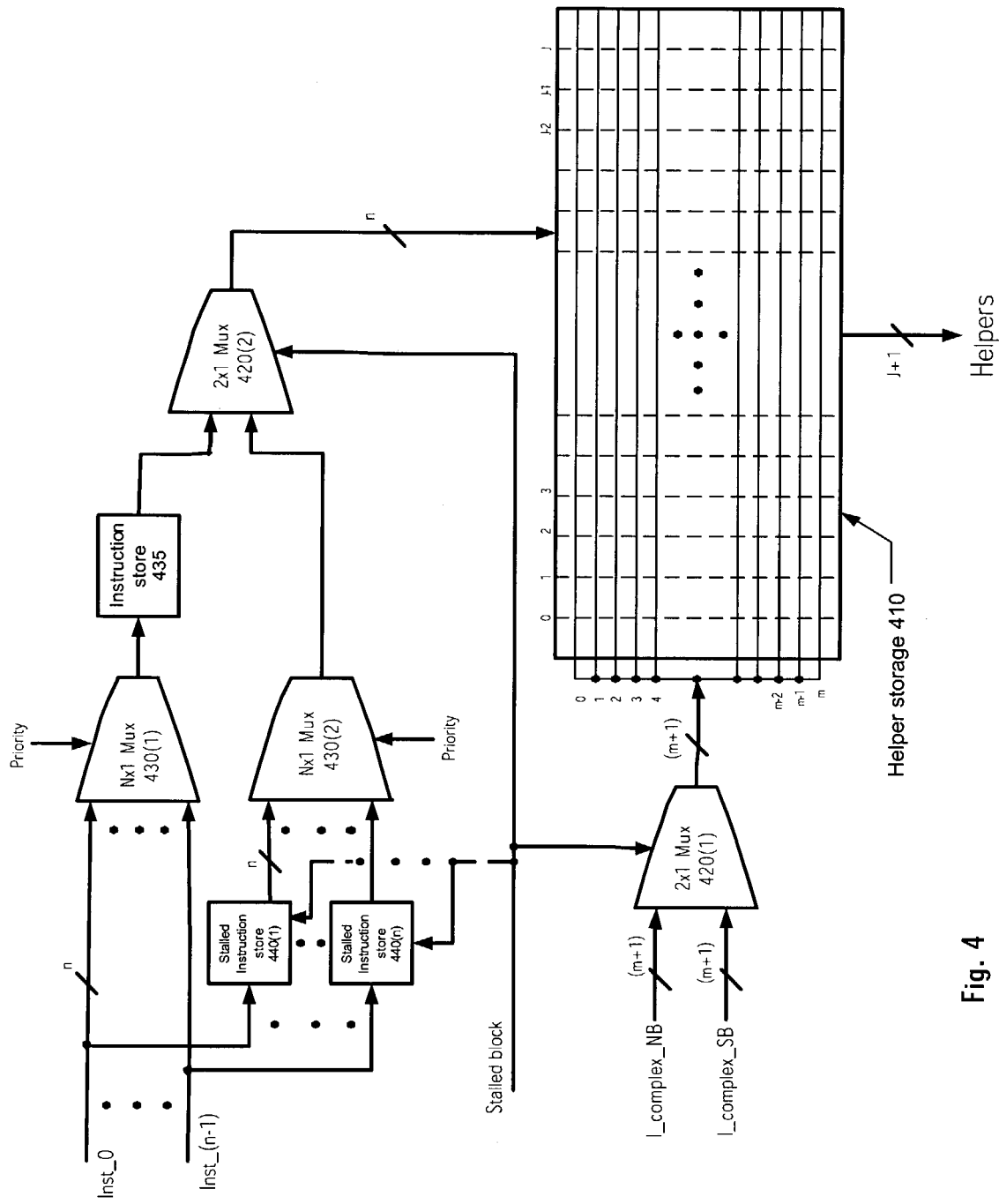
FIG. 4 illustrates an example of a helper storage according to an embodiment of the present invention.

FIG. 4 illustrates an example of a helper storage 410 according to an embodiment of the present invention. Helper storage 410 is configured as (m+1)×(J+1) storage including 'm+1' words where each word is 'J+1' bits long. The number of bits in each word can be configured to represent a number of simple instructions. For example, in a three instruction machine that fetches three instructions in each cycle, J+1 bits can be configured to represent three simple instructions plus additional information bits if needed. The additional information bits can be used for appropriate control and administration purposes (e.g., order of the instruction, load/store and the like). Helper storage 410 receives word line control from a 2×1 multiplexer 420(1) and bit line selection input from a 2×1 multiplexer 420(2).

The word line selector multiplexer 420(1) selects between two input vectors I_complex_NB and I_complex_SB such as stored in vector stores 240 and 287 shown in FIG. 2. The bit lines are selected by multiplexer 420(2). Multiplexer 420(2) selects among instructions forwarded by instruction store 435 and N×1 MUX 430(2). Multiplexer 430(1) represents a block of recently fetched instructions (new block) and multiplexer 430(2) represents a block of previously fetched instructions (stalled block). Multiplexer 430(1) selects one of the newly fetched instruction based on the priority (age) of the instruction. Similarly, multiplexer 430(2) selects from a block of previously fetched instructions based on the priority (age) of the instruction.

The number of helper instructions in each complex instruction can vary according to the function of the complex instruction. However, if the processor is configured to retrieve certain number of instructions in one cycle (e.g., three in the present case) then each vector address retrieves that many number of helpers from the helper storage. A complex instruction can require fewer helpers than can be fetched in one cycle and the helper storage must be configured to address this situation. One way to resolve that is to add no operation (NOP) instructions in the 'empty slots' of a fetch group. For example, if a complex instruction requires four helpers in a processor with a fetch group of three instructions per cycle then the complex instruction needs at least two cycles to retrieve helpers from the helper storage because the helper storage is configured to provide three helpers in each cycle. The first cycle retrieves three helpers from the helper storage and the second cycle also retrieves three helpers from the helper storage. However, the complex instruction only requires four helpers (i.e., one helper in the second cycle) thus the remaining two helpers can be programmed with slot fillers such as NOP or similar or other functions (e.g., administrative instruction, performance measurement instruction or the like).

Retrieving the same number of helpers from the helper storage as the number of instructions that can be fetched in one cycle simplifies the logic design for vector generation. Every time a vector is presented as the word address to helper storage, the helper storage provides all the helpers corresponding to the vector including the 'slot fillers' (e.g., NOP, administrative, performance related instructions or the like). Retrieving the same number of helpers corresponding to a fetch group improves the speed of address interpretation.

When IDU 130 receives fetched instructions, Inst_0–Inst_(n–1), IDU 130 forwards the instructions to multiplexer 430(1). However, when IDU 130 recognizes that one or more instructions in the fetched group are complex instruction, IDU 130 provides a stalled block control to stores 440(1)–(n) to store the group of fetched instructions because before IDU 130 signals the IFU 120 to stop fetching more instructions, IFU 120 has already fetched a new group of instructions. To prevent an override of instructions at bit line select of helper storage 410, IDU 130 saves the previously fetched group of instructions (stalled block) in stores 440(1)–(n) using stalled block control. The stalled block control is also used to select the instructions from the previous block at multiplexer 420(2). While for purposes of illustration, in the present example, two groups of fetched instructions are shown, one skilled in the art will appreciate that depending upon the architecture of the processor any number of groups of fetched instructions can be used. Further, the helper storage can be configured using any address decode logic (e.g., address controller, programmable address decode logic or the like) to retrieve helpers from helper storage 410. The configuration of helper storage 410 depends upon the configuration of instruction opcodes in the processor. The column address for helper storage 410 can be configured to include hardwired bits according to the configuration of instruction opcodes so that appropriate helpers can be retrieved from helper storage 410 for a given complex instruction.

Figure 5:
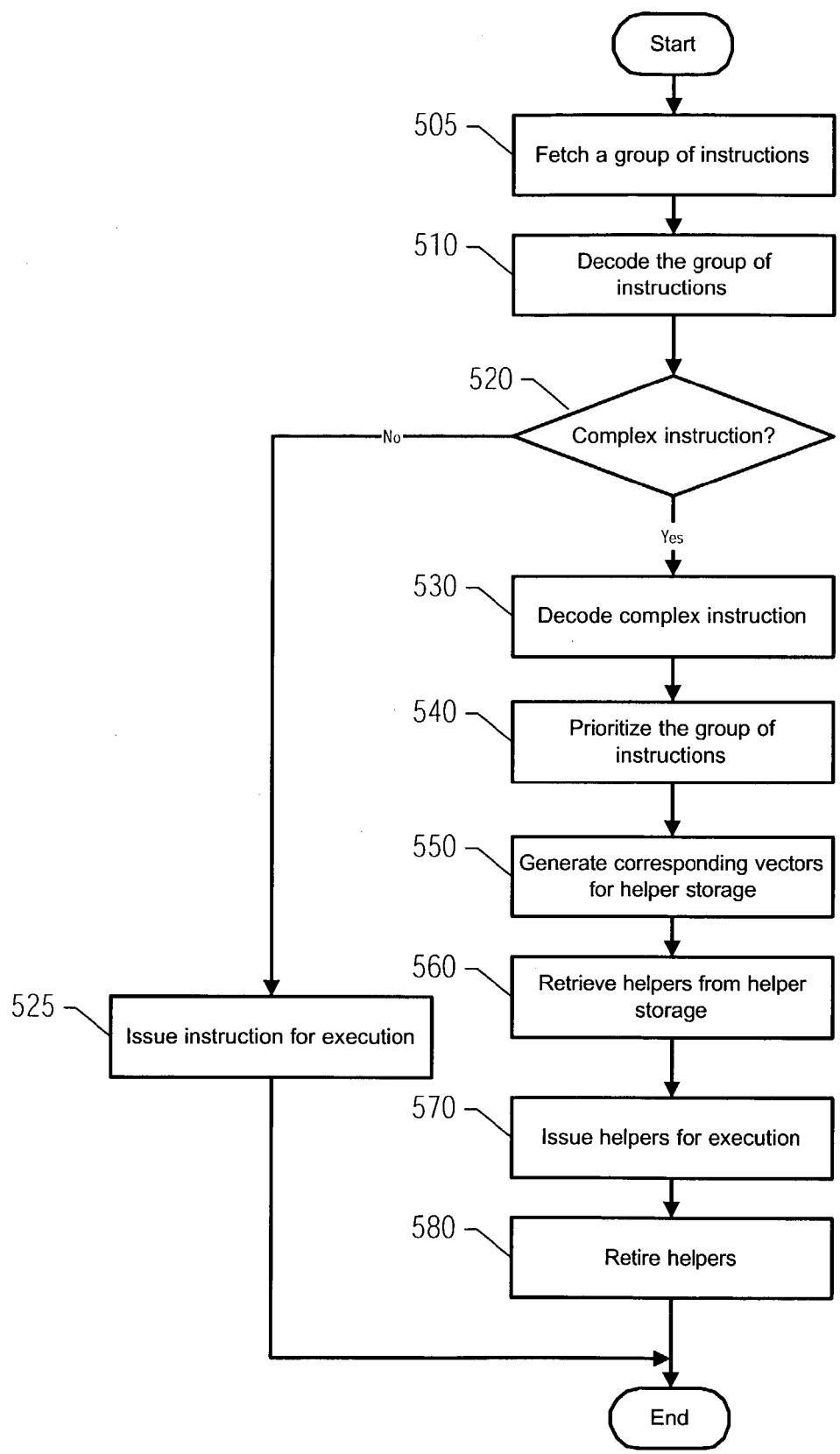
FIG. 5 is a flow diagram illustrating an exemplary sequence of operations performed during a process of preparing complex instructions for execution on a processor according to an embodiment of the present invention.

FIG. 5 is a flow diagram illustrating an exemplary sequence of operations performed during a process of preparing instructions for execution on a processor according to an embodiment of the present invention. While the operations are described in a particular order, the operations described herein can be performed in other sequential orders (or in parallel) as long as dependencies between operations allow. In general, a particular sequence of operations is a matter of design choice and a variety of sequences can be appreciated by persons of skill in art based on the description herein.

Initially, process fetches a group of instructions (505). The group of instructions can be fetched by any processor element (e.g., instruction fetch unit or the like). The instructions can be fetched from external instruction storage or from prefetch units (e.g., instruction cache or the like). The process decodes the group of fetched instructions (510). The instructions can be decoded using various means (e.g., by instruction decode unit or the like). The process determines whether the group of instruction includes one or more complex instructions (520). If the group of instructions does not include complex instructions, the process issues the group of instructions for execution (525).

If the group of instructions includes at least one complex instruction, the process decodes the complex instruction (530). The complex instructions can be further decoded to determine the specific functions required by the complex instruction. The process prioritizes the group of instructions (540). According to an embodiment of the present invention, after determining that the group of fetched instructions includes at least one complex instruction, the instructions in the group are prioritized based on the 'age' of the complex instructions i.e., the complex instructions are processed according to an order in which the complex instructions were fetched.

The process generates one or more vectors for the complex instruction to retrieve corresponding helpers from the helper storage (550). The complex instructions may require more than one helper instruction to execute the associated functions. The number of vectors generated depends upon the number of corresponding helpers required for the complex instruction and the configuration of the helper storage. For example, if the helper storage is configured to release a group of three helper instructions for each vector and the complex instruction requires seven helpers then at least three vectors are needed to retrieve all the corresponding helpers for the complex instruction. The helper storage can be configured to release as many helpers as the number of instructions that can be fetched by the processor in one cycle.

Further, as previously described herein, the groups of helper instructions can be filled with additional simple instructions not related to the function of the complex instruction. For example, if a complex instruction requires four helpers and the helper storage is configured to release three helpers for each vector per cycle then at least two vectors are needed to retrieve all the corresponding helpers. After the first vector, the helper storage can release three more helper instructions for the second vector however the complex instruction only requires one more helper thus the group of helpers can be filled with two non-related instructions (e.g., NOP or the like).

The process retrieves corresponding helpers from the helper storage (560). The process issues the helpers for execution (570). The process retires the helpers after the execution (580). When the helpers are retired, the process accomplishes the function of the complex instruction and the remaining instructions within the group of fetched instructions are processed accordingly.

Figure 6:
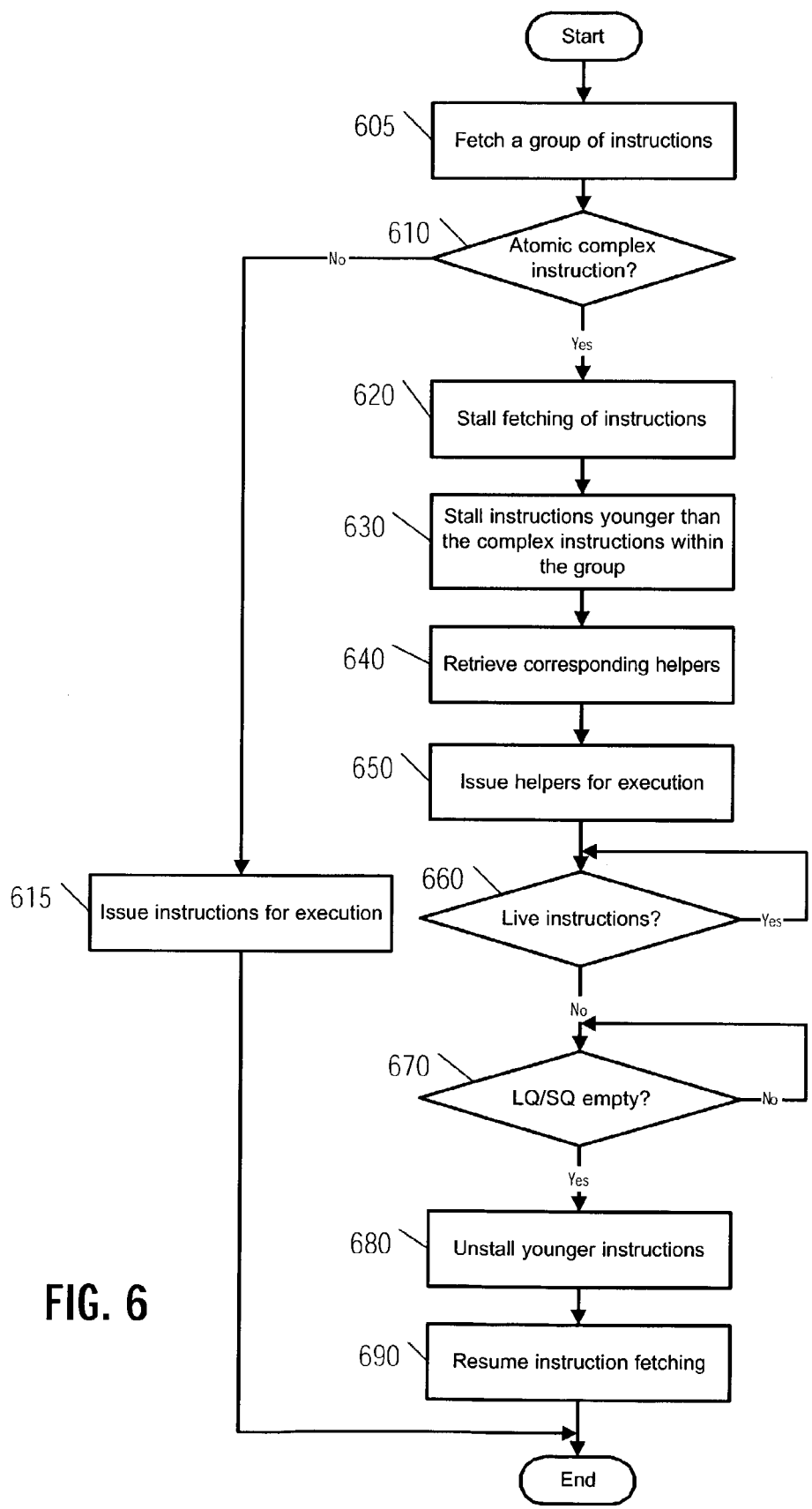
FIG. 6 is a flow diagram illustrating an exemplary sequence of operations performed during a process of executing an atomic complex instruction while maintaining the atomicity of the complex instruction by stalling instruction fetching and the instructions younger than the complex instruction according to an embodiment of the present invention.

FIG. 6 is a flow diagram illustrating an exemplary sequence of operations performed during a process of executing a complex instruction which is atomic in nature, while maintaining the atomicity of the complex by stalling instruction fetching and the instructions younger than the complex instruction according to an embodiment of the present invention. While the operations are described in a particular order, the operations described herein can be performed in other sequential orders (or in parallel) as long as dependencies between operations allow. In general, a particular sequence of operations is a matter of design choice and a variety of sequences can be appreciated by persons of skill in art based on the description herein.

Initially, process fetches a group of instructions (605). The group of instructions can be fetched by any processor element (e.g., instruction fetch unit or the like). The instructions can be fetched from external instruction storage or from pre-fetch units (e.g., instruction cache or the like). The process determines whether the group of instruction includes one or more complex instructions which are atomic in nature (610). The determination of complex instructions which are atomic in the group of fetched instruction can be performed using various known instruction decoding techniques. If the group of instructions does not include any atomic complex instruction, the process issues the instructions for execution (615).

If the group of fetched instructions includes at least one complex instruction which is atomic in nature, the process stalls further fetching of instructions (620). The instruction fetching can be stalled, for example, by controlling the instruction fetch unit or the like. The process stalls the instructions 'younger' than the complex instruction within the group of fetched instructions (630). In out-of-order processors, instructions can be issued regardless of the order in which the instructions are fetched. According to an embodiment of the present invention, complex instructions which are atomic in nature are executed atomically. To simplify the logic related to implementation of the atomicity of the complex instructions, upon determining that the group of fetched instructions includes at least one complex instruction which is atomic in nature, the process stalls the execution of instructions 'younger' than the particular atomic complex instruction. The 'age' of an instruction can be determined according to an order in which the instructions are fetched.

According to an embodiment of the present invention, the 'younger' instructions are stalled using a method and system shown and described in FIG. 2 and FIG. 3. The complex instructions which are atomic within the group of fetched instructions are prioritized according to the 'age' of the instruction and subsequently, vectors are generated using the priority for each one of the complex instruction to retrieve corresponding helpers. The vectors for lower priority complex instructions are stored in respective stalled vector generator (e.g., as shown and described in FIG. 2 or the like) and processed accordingly.

The process retrieves helpers corresponding to the complex instruction from helper storage (640). The helpers can be retrieved from the helper storage using various helper storage addressing techniques (e.g., generating address vectors or the like). The process issues corresponding helpers for execution (650). The process determines whether there is any 'live' instruction in the processor pipeline (660). The 'live' instructions are instructions for which the execution has not been completed for various reasons (e.g., waiting for dependencies to clear, exception processing or the like). The process insures that execution of all the 'live' instructions in the pipeline has been completed (i.e., all instructions have left live instruction table) before proceeding further. The determination of 'live' instructions can be made using various known techniques (e.g., maintaining 'live' instruction tables or the like).

When the process determines that there are no 'live' instructions in the pipeline, the process determines if the load queue and store queue are empty (670). The process ensures that load queue and store queue are empty before proceeding further. When the process determines that load and store queues are empty, the process unstalls the younger instructions from the group of fetched instructions that were stalled in 630 (680). The process resumes instruction fetching (690). According to an embodiment of the present invention, the instructions can be prioritized according to order in which the instructions are fetched to determine the 'age' of each instruction. One skilled in the art will appreciate that a group of fetched instruction can include more than one complex instructions which are atomic and the process can be executed repeatedly for each complex instruction within the group of fetched instructions.

Figure 7:
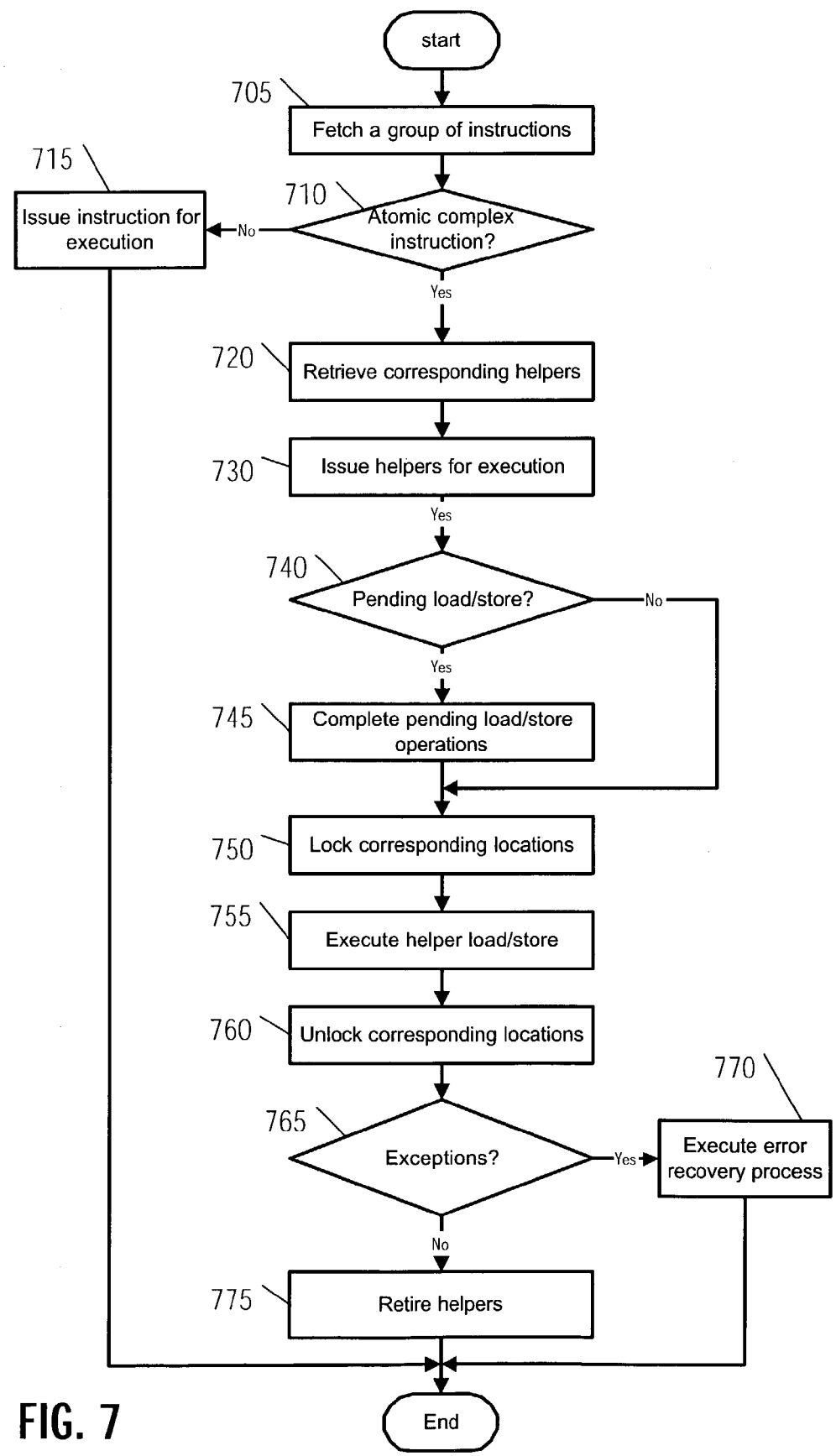
FIG. 7 is a flow diagram illustrating an exemplary sequence of operations performed during a process of executing an atomic complex instruction while maintaining the atomicity of the complex instruction by emptying the load/store queues according to an embodiment of the present invention.

FIG. 7 is a flow diagram illustrating an exemplary sequence of operations performed during a process of executing an atomic complex instruction while maintaining the atomicity of the complex instruction by emptying the load/store queues according to an embodiment of the present invention. While the operations are described in a particular order, the operations described herein can be performed in other sequential orders (or in parallel) as long as dependencies between operations allow. In general, a particular sequence of operations is a matter of design choice and a variety of sequences can be appreciated by persons of skill in the art based on the description herein.

Initially, process fetches a group of instructions (705). The group of instructions can be fetched by any processor element (e.g., instruction fetch unit or the like). The instructions can be fetched from external instruction storage or from pre fetch units (e.g., instruction cache or the like). The process determines whether the group of instruction includes one or more atomic complex instructions (710). The determination of atomic complex instruction in the group of fetched instruction can be performed using various known instruction decoding techniques. If the group of instructions does not include at least one atomic complex instruction, the process issues the group of instructions for execution (715).

If the group of fetched instructions includes at least one complex instruction which is atomic, the process retrieves corresponding groups of helpers for the complex instruction from a helper storage (720). The process issues the helper instructions for execution (730). If the groups of helpers include load/store operations, the process determines whether there are pending load/store operation for previously executed instructions in the pipeline (740). According to an embodiment of the present invention, load/store operations for each instruction can be queued in appropriate queues before final execution. For example, the data cache unit can maintain respective load/store queues for each processing unit in a given processor. The load/store queues can store data before final read/write of corresponding memory locations.

If there are no pending load/store operations for previously executed instructions (e.g., load/store queues are empty or the like), the process proceeds to execute appropriate helpers. If there are pending load/store operations (e.g., load/store queues are not empty or the like), the process completes all the pending load/store operations in the pipeline (i.e., empties appropriate load/store queues to complete pending transactions with the memory or the like) (745). The process locks the corresponding memory location for helper load/store operation to avoid multiple access of the corresponding memory location and maintain the atomicity of the complex instruction (750).

The process executes helper load/store (755). The process unlocks the corresponding memory locations (760). The process determines whether the execution of helper caused system exception (765). If the execution of helper causes exception, the process executes predetermined error recovery process (770). If the execution of helpers did not cause any exception, the process retires all the corresponding helpers (775).

Complex Instruction Set

The complex instructions can be defined according to the architecture of the target processor. In some embodiments, the present invention defines a set of functions that require more than one simple instruction. Each function is represented by a complex instruction. Table 1 illustrates an example of a partial set of various functions in floating point and graphics units of a given target processor. While for purposes of illustration, in the present example, each complex instruction is further broken down into various numbers of simple instructions (helpers) however one skilled in the art will appreciate that the number of helpers for each complex instruction can be defined according to the architecture of the target processor (e.g., the number of instructions that can be fetched in one processor cycle, number of simple instructions required to accomplish a given complex function, flexibility of the processor architecture and the like).

TABLE 1

An example of complex instructions for floating point and graphics function.

| # | Instruction/ Signal | Instruction format and helper Instructions generated | Helper definition |
|---|---|---|---|
| 1 | LDDFA (Block load) | LDDFA [addr]%asi, %f0<br>1. H_LDDFA [addr]%asi, %f0<br>2. H_LDDFA [addr]%asi, %f2<br>3. H_LDDFA [addr]%asi, %f4<br>4. H_LDDFA [addr]%asi, %f6<br>5. H_LDDFA [addr]%asi, %f8<br>6. H_LDDFA [addr]%asi, %f10<br>7. H_LDDFA [addr]%asi, %f12<br>8. H_LDDFA [addr]%asi, %f14 | The helpers copy 8 byte data (double word) from their effective address into their destination registers. Effective address for individual helpers are<br>1. [addr]%asi<br>2. [addr+0x8]%asi<br>3. [addr+0x10]%asi<br>4. [addr+0x18]%asi<br>5. [addr+0x20]%asi<br>6. [addr+0x28]%asi<br>7. [addr+0x30]%asi<br>8. [addr+0x38]%asi |
| 2 | STDFA (Block store) | STDFA [addr]%asi, %f0<br>1. H_STDFA %f0,[addr]%asi<br>2. H_STDFA %f2,[addr]%asi<br>3. H_STDFA %f4,[addr]%asi<br>4. H_STDFA %f6,[addr]%asi<br>5. H_STDFA %f8,[addr]%asi<br>6. H_STDFA %f10,[addr]%asi<br>7. H_STDFA %f12,[addr]%asi<br>8. H_STDFA %f14,[addr]%asi | The helpers copy the data in their destination registers into memory addressed by their effective addresses. Effective address for individual helpers are<br>1. [addr]%asi<br>2. [addr+0x8]%asi<br>3. [addr+0x10]%asi<br>4. [addr+0x18]%asi<br>5. [addr+0x20]%asi<br>6. [addr+0x28]%asi<br>7. [addr+0x30]%asi<br>8. [addr+0x38]%asi |
| 3 | PDIST (distance between 8 8-bit components) | PDIST %f0, %f2, %f4<br>1. H_PDIST %f0, %f2, %ftmp<br>2. H_PDISTADD %ftmp, %f4, %f4 | 1. Takes 8 unsigned 8-bit values in dp fp registers %f0 and %f2, subtracts corresponding 8-bit values in these registers and writes the sum of the absolute value of each difference into its corresponding entry in FWRF (i.e if %ftmp gets renamed to 31(assuming a 32 entry FWRF) then sum will be written into entry 31 of FWRF). Also %ftmp register is used to establish dependencies (i.e during retirement of this instruction the value in FWRF does not get written into FARF as %ftmp is not part of FARF) and is assumed to have an entry mapping in FRT(fp rename table)).<br>2. Adds the 64-bit value in dp %f4 register with the value in FWRF and writes the result into dp %f4 register. |
| 4 | LDXFSR (load extended %fsr) | LDXFSR [addr], %fsr<br>1. H_LDXFSR [addr], %ftmp<br>2. H_MOVFA %fcc1, %ftmp, %fcc1<br>3. H_MOVFA %fcc2, %ftmp, %fcc2<br>4. H_MOVFA %fcc3, %ftmp, %fcc3 | 1. When issued, loads 64-bit data at address [addr] into its corresponding entry (i.e., the entry to which %ftmp and %fcc0 gets mapped to) in FWRF and CWRF. While retired, writes the 64-bit data in FWRF into %fsr which is assumed to be residing in FGU and writes the data in CWRF into %fcc0 which is part of CARF.<br>2. When issued copies the 2-bit data in field [33:32] of %ftmp into its corresponding entry in CWRF. While retirement writes the data in CWRF into %fcc1 which is part of CARF.<br>3. When issued copies the 2-bit data in field [35:34] of %ftmp into its corresponding entry in CWRF. While retirement writes the data in CWRF into %fcc2 which is part of CARF.<br>4. When issued copies the 2-bit data in field [37:36] of %ftmp into its corresponding entry in CWRF. While retirement writes the data in CWRF into %fcc1 which is part of CARF. |

Table 2 illustrates an example of a partial set of various complex integer functions of a given target processor, represented by corresponding complex instructions. While for purposes of illustration, in the present example, each integer complex instruction is further broken down into various numbers of simple instructions (helpers) however one skilled in the art will appreciate that the number of helpers for each integer complex instruction can be defined according to the architecture of the target processor, for example, the number of instructions that can be fetched in one processor cycle, number of simple instructions required to accomplish a given complex function, flexibility of the processor architecture and the like.

TABLE 2

An example of complex instructions in integer instruction set

| # | Instruction/Signal | Instruction format and helper instructions generated | Helper definition |
|---|---|---|---|
| 1 | LDD (load doubleword) (ATOMIC) | LDD [addr], %o0<br>1. H_LDX [addr], %tmp1<br>2. H_SRLX %tmp1, 32, %o0<br>3. H_SRL %tmp1, 0, %o1 | 1. Double word at memory address [addr] is copied into %tmp1 register.<br>2. Write the upper 32-bits of %tmp1 into the lower 32-bits of %o0. The upper 32-bits of %o0 are zero filled.<br>3. Write the lower 32-bits of %tmp1 into the lower 32-bits of %o1. The upper 32-bits of %o1 are zero filled.<br>When the data has to be loaded in the little-endian format then while executing the first helper the 64-bit data read from the address [addr] has to be converted into little-endian format before writing it into %tmp1 register. |
| 2 | LDDA (load doubleword from alternate space) (ATOMIC) | LDDA [addr]%asi, %o0<br>1. H_LDXA [addr]%asi, %tmp1<br>2. H_SRLX %tmp1, %o0<br>3. H_SRL %tmp1, %o1 | 1. Double word at memory address [addr]%asi is copied into %tmp1 register. It contains ASI to be used for the load.<br>2. Write the upper 32-bits of %tmp1 into the lower 32-bits of %o0. The upper 32-bits of %o0 are zero filled.<br>3. Writes the lower 32-bits of %tmp1 into the lower 32-bits of %o1. The upper 32-bits of %o1 are zero filled. When the data has to be loaded in the little-endian format then while executing the first helper the 64-bit data read from the address [addr]%asi has to be converted into little-endian format before writing it into %tmp1 register. |
| 3 | LDDA (load quad word from alternate space) (ATOMIC) | LDDA [addr]%asi, %o0<br>1. H_LDXA ([rs1]+[rs2])%asi, %tmp2<br>2. H_ADD %rs1, 8, %tmp1<br>3. H_LDXA ([%tmp1]+[rs2])%asi, %o1<br>4. H_OR %tmp2, %g0, %o0 | 1. Load the lower address 64-bits into %tmp2<br>2. Increment content of %rs1 by 8 and the result into %tmp1<br>3. Load the upper address 64-bits into %o1<br>4. Move the contents of %tmp2 to %o0 |
| 4 | LDSTUB (load store unsigned byte) (ATOMIC) | LDSTUB [addr], %o0<br>1. H_LDUB [addr], %tmp2<br>2. H_SUB %g0, 1, %tmp1<br>3. H_STB %tmp1, [addr]<br>4. H_OR %tmp2, %g0, %o0 | 1. Copies a byte from the addressed memory location [addr] into %tmp2. The addressed byte is right justified and zero-filled on the left.<br>2. Writes 1 into %tmp1.<br>3. Stores the addressed memory location [addr] with the value in %tmp1(i.e all ones).<br>4. Copy the value in %tmp2 into %o0. |
| 5 | LDSTUBA (load store unsigned byte into alternate space) (ATOMIC) | LDSTUBA [addr]%asi, %o0<br>1. H_LDUBA [addr]%asi, %tmp2<br>2. H_SUB %g0, 1, %tmp1<br>3. H_STBA %tmp1, [addr]%asi<br>4. H_OR %tmp2, %g0, %o0 | 1. Copies a byte from the addressed memory location [addr] into %tmp2. The addressed byte is right justified and zero-filled on the left. It contains ASI to be used for the load.<br>2. Writes 1 into %tmp1.<br>3. Stores the addressed memory location [addr] with the value in %tmp1(i.e all ones). It contains ASI to be used for the store.<br>4. Copy the value in %tmp2 into %o0. |
| 6 | STD (store double word) (ATOMIC) | STD %o0, [addr]<br>1. H_MERGE %o1, %o0, %tmp1<br>2. H_STX %tmp1, [addr] | 1. Copies the lower 32-bits of %o0 into the upper 32-bits of %tmp1 register and the lower 32-bits of %o1 into the lower 32-bits of %tmp1 register.<br>2. Writes the 64-bit word in %tmp1 into memory at address [addr]. When the data has to be stored in the little-endian format then while executing the second helper the 64-bit data in %tmp register has to be converted into little-endian format before writing it into the address [addr]. |
| 7 | STDA (store doubleword into alternate space) (ATOMIC) | STDA %o0, [addr]%asi<br>1. H_MERGE %o1, %o0, %tmp1<br>2. H_STXA %tmp1, [addr]%asi | 1. Copies the lower 32-bits of %o0 into the upper 32-bits of %tmp1 register and the lower 32-bits of %o1 into the lower 32-bits of %tmp1 register.<br>2. Writes the 64-bit word in %tmp1 into memory at address [addr]%asi. It contains ASI |

TABLE 2-continued

An example of complex instructions in integer instruction set

| # | Instruction/Signal | Instruction format and helper instructions generated | Helper definition |
|---|---|---|---|
| | | | to be used for the store. When the data has to be stored in the little-endian format then while executing the second helper the 64-bit data in %tmp register has to be converted into little-endian format before writing it into the address [addr]%asi. |
| 8 | UMUL (unsigned integer multiply) | UMUL %i0, %i1, %o0<br>1. H_UMUL %i0, %i1, %tmp1<br>2. H_SRLX %tmp1, 32, %y<br>3. H_OR %tmp1, %g0, %o0 | 1. Computes 32-bit by 32-bit multiplication of unsigned integer words in registers %i0 and %i1 and write the unsigned integer double word product into the destination register %tmp1.<br>2. Writes the upper 32-bits of the product in %tmp1 into the lower 32-bits of %y register.<br>3. Copies the value in %tmp1 into %o0. |
| 9 | SMUL (signed integer multiply) | SMUL %i0, %i1, %o0<br>1. H_SMUL %i0, %i1, %tmp1<br>2. H_SRLX %tmp1, 32, %y<br>3. H_OR %tmp1, %g0, %o0 | 1. Compute 32-bit by 32-bit multiplication of signed integer words in registers %i0 and %i1 and write the signed integer doubleword product into the destination register %tmp1.<br>2. Writes the upper 32-bits of the product in %tmp1 into the lower32-bits of %y register.<br>3. Copies the value in %tmp1 into %o0. |
| 10 | UMULcc (unsigned integer multiply and modify condition codes) | UMULcc %i0, %i1, %o0<br>1. H_UMULcc %i0, %i1, %tmp1<br>2. H_SRLX %tmp1, 32, %y<br>3. H_OR %tmp1, %g0, %o0 | 1. Computes 32-bit by 32-bit multiplication of unsigned integer words in registers %i0 and %i1 and write the unsigned integer double word product into the destination register %tmp1. It modifies the integer condition code bits.<br>2. Writes the upper 32-bits of the product in %tmp1 into the lower 32-bits of %y register.<br>3. Copies the value in %tmp1 into %o0. |
| 11 | SMULcc (signed integer multiply and modify condition codes) | SMULcc %i0, %i1, %o0<br>1. H_SMULcc %i0, %i1, %tmp1<br>2. H_SRLX %tmp1, 32, %y<br>3. H_OR %tmp1, %g0, %o0 | 1. Computes 32-bit by 32-bit multiplication of signed integer words in registers %i0 and %i1 and write the signed integer doubleword product into the destination register %tmp1. It modifies the integer condition code bits.<br>2. Writes the upper 32-bits of the product in %tmp1 into the lower 32-bits of %y register.<br>3. Copies the value in %tmp1 into %o0. |
| 12 | UDIV (unsigned integer divide) | UDIV %i0, %i1, %o0<br>1. H_MERGE %i0, %y, %tmp1<br>2. H_UDIV %tmp1, %i1, %o0 | 1. Copies the lower 32-bits of %y register into the upper 32-bits of %tmp1 register and the lower 32-bits of %i0 into the lower 32-bits of %tmp1 register.<br>2. Divides the unsigned 64-bit value in %tmp1 by the unsigned lower 32-bit value in %i1 and write the unsigned integer word quotient into %o0. It rounds an inexact rational quotient toward zero. When overflow occurs the largest appropriate unsigned integer is returned as the quotient in %o0. When no overflow occurs the 32-bit result is zero extended to 64-bits and written into %o0. |
| 13 | SDIV (signed integer divide) | SDIV %i0, %i1, %o0<br>1. H_MERGE %i0, %y, %tmp1<br>2. H_SDIV %tmp1, %i1, %o0 | 1. Copies the lower 32-bits of %y register into the upper 32-bits of %tmp1 register and the lower 32-bits of %i0 into the lower 32-bits of %tmp1 register.<br>2. Divides the signed 64-bit value in %tmp1 by the signed lower 32-bit value in %i1 and write the signed integer word quotient into %o0. It rounds an inexact rational quotient toward zero. When<br>overflow occurs the largest appropriate signed integer is returned as the quotient in %o0. When no overflow occurs the 32-bit result is sign extended to 64-bits and written into %o0. |
| 14 | UDIVcc (unsigned integer divide and modify condition codes) | UDIVcc %i0, %i1, %o0<br>1. H_MERGE %i0, %y, %tmp1<br>2. H_UDIVcc %tmp1, %i1, %o0 | 1. Copies the lower 32-bits of %y register into the upper 32-bits of %tmp1 register and the lower 32-bits of %i0 into the lower 32-bits of %tmp1 register.<br>2. Divides the unsigned 64-bit value in %tmp1 by the unsigned lower 32-bit value in %i1 and write the unsigned integer word quotient into %o0. It rounds an inexact rational quotient toward zero. When overflow occurs the largest |

TABLE 2-continued

An example of complex instructions in integer instruction set

| # | Instruction/Signal | Instruction format and helper instructions generated | Helper definition |
|---|---|---|---|
| | | | appropriate unsigned integer is returned as the quotient in %o0. When no overflow occurs the 32-bit result is zero extended to 64-bits and written into %o0. It modifies the integer condition codes. |
| 15 | SDIVcc (signed integer divide and modify condition codes) | SDIVcc %i0, %i1, %o0<br>1. H_MERGE %i0, %y, %tmp1<br>2. H_SDIVcc %tmp1, %i1, %o0 | 1. Copies the lower 32-bits of %y register into the upper 32-bits of %tmp 1 register and the lower 32-bits of %i0 into the lower 32-bits of %tmp1 register.<br>2. Divides the signed 64-bit value in %tmp1 by the signed lower 32-bit value in %i1 and write the signed integer word quotient into %o0. It rounds an inexact rational quotient toward zero. When overflow occurs the largest appropriate signed integer is returned as the quotient in %o0. When no overflow occurs the 32-bit result is sign extended to 64-bits and written into %o0. it modifies the integer condition codes. |
| 16 | CASA(i=0) (compare and swap word from alternate space) (ATOMIC) | CASA [%i0]imm_asi, %i1, %o0<br>1. H_OR %g0, %o0, %tmp2<br>2. H_LDUWA [%i0]imm_asi, %tmp1<br>3. H_SUBcc %tmp1, %i1, %g0<br>4. H_MOVNE %tmp1, %tmp2<br>5. H_STWA %tmp2, [%i0]imm_asi<br>6. H_OR %tmp1, %g0, %o0 | 1. Copies the value in %o0 into %tmp2.<br>2. Loads the zero extended word from the memory location pointed by the word address [%i0]imm_asi into %tmp1.<br>3. Compares the lower 32-bits of %tmp1 and %i1 and modify the temporary condition codes "tmpcc".<br>4. tmpicc.Z is tested and, if 0 the contents of %tmp1 are written into %tmp2, if 1 the contents of %tmp2 remains unchanged.<br>5. Stores the lower 32-bits of %tmp2 into memory location pointed by the word address [%i0]imm_asi.<br>6. Copies the value in %tmp1 into %o0. |
| 17 | CASA(i =1) (compare and swap word from alternate space) (ATOMIC) | CASA [%i0]%asi, %i1, %o0<br>1. H_OR %g0, %o0, %tmp2<br>2. H_LDUWA [%i0]%asi, %tmp1<br>3. H_SUBcc %tmp1, %i1, %g0<br>4. H_MOVNE %tmp1, %tmp2<br>5. H_STWA %tmp2, [%i0]%asi<br>6. H_OR %tmp1, %g0, %o0 | 1. Copies the value in %o0 into %tmp2.<br>2. Load the zero extended word from the memory location pointed by the word address [%i0]%asi into %tmp1.<br>3. Compares the lower 32-bits of %tmp1 and %i1 and modify the temporary condition codes "tmpcc".<br>4. tmpicc.Z is tested and, if 0 the contents of %tmp1 are written into %tmp2, if 1 the contents of %tmp2 remains unchanged.<br>5. Stores the lower 32-bits of %tmp2 into memory location pointed by the word address [%i0]%asi.<br>6. Copies the value in %tmp1 into %o0. |
| 18 | CASXA (i =0) compare and swap extended from alternate space (ATOMIC) | CASXA [%i0]imm_asi, %i1, %o0<br>1. H_OR %g0, %o0, %tmp2<br>2. H_LDXA [%i0]imm_asi, %tmp1<br>3. H_SUBcc %tmp1, %i1, %g0<br>4. H_MOVNE %tmp1, %tmp2<br>5. H_STXA %tmp2, [%i0]imm_asi<br>6. H_OR %tmp1, %g0, %o0 | 1. Copies the value in %o0 into %tmp2.<br>2. Loads the double word from the memory location pointed by the double word address [%i0]imm_asi into %tmp1.<br>3. Compares the double words stored in %tmp1 and %i1 and modify the temporary condition codes "tmpcc".<br>4. tmpxcc.Z is tested and, if 0 the contents of %tmp1 are written into %tmp2, if 1 the contents of %tmp2 remains unchanged.<br>5. Stores the double word in %tmp2 into memory location pointed by the double word address [%i0]imm_asi.<br>6. Copies the value in %tmp1 into %o0. |
| 19 | CASXA (i=1) (compare and swap extended from alternate space) (ATOMIC) | CASXA [%i0]%asi, %i1, %o0<br>1. H_OR %g0, %o0, %tmp2<br>2. H_LDXA [%i0]%asi, %tmp1<br>3. H_SUBcc %tmp1, %i1, %g0<br>4. H_MOVNE %tmp1, %tmp2<br>5. H_STXA %tmp2, [%i0]%asi | 1. Copies the value in %o0 into %tmp2.<br>2. Loads the double word from the memory location pointed by the double word address [%i0]%asi into %tmp1.<br>3. Compares the double words stored in %tmp1 and %i1 and modify the temporary condition codes "tmpcc".<br>4. tmpxcc.Z is tested and, if 0 the contents of %tmp1 are written into %tmp2, if 1 the contents of %tmp2 remains unchanged.<br>5. Stores the double word in %tmp2 into memory location pointed by the double word |

TABLE 2-continued

An example of complex instructions in integer instruction set

| # | Instruction/Signal | Instruction format and helper instructions generated | Helper definition |
|---|---|---|---|
| | | 6. H_OR %tmp1, %g0, %o0 | address [%i0]%asi.<br>6. Copies the value in %tmp1 into %o0. |
| 20 | SWAP<br>(swap register with memory)<br>(ATOMIC) | SWAP [addr], %o0<br>1. H_LDUW [addr], %tmp1<br>2. H_STW %o0, [addr]<br>3. H_OR %tmp1, %g0, %o0 | 1. Loads the zero extended word stored in memory location pointed by the word address [addr]into %tmp1.<br>2. Stores the lower 32-bits of %o0 into memory location pointed by the word address [addr].<br>3. Copies the contents of %tmp1 into %o0. |
| 21 | SWAPA<br>(swap register with alternate space memory)<br>(ATOMIC) | SWAPA [addr]%asi, %o0<br>1. H_LDUWA [addr]%asi, %tmp1<br>2. H_STWA %o0, [addr]%asi<br>3. H_OR %tmp1, %g0, %o0 | 1. Loads the zero extended word stored in memory location pointed by the word address [addr]into %tmp1. It contains ASI to be used for the load.<br>2. Stores the lower 32-bits of %o0 into memory location pointed by the word address [addr]. It contains ASI to be used for the store.<br>3. Copies the contents of %tmp1 into %o0. |

Atomicity of Complex Instructions

Many of the complex instructions described in Tables 1 and 2, are atomic instructions. The atomicity of all the complex instructions is preserved. According to some embodiments of the present invention, IDU 130 identifies atomic instructions as serializing instruction with 'sync_after' semantics. Once IDU 130 identifies a complex instruction within the group of fetched instructions, IDU 130 forwards all the instructions older to the complex instruction including the complex instruction for execution and stalls instructions younger to the complex instruction.

IDU 130 unstalls the younger instructions when IDU 130 determines that all the instructions that were in the process of being executed (live instructions), are executed and load/store queues are empty. Typically, the load/store queues store the data to be loaded/stored to/from respective memory locations. In an out of order processor, the helper instructions for corresponding complex instruction can be issued out-of-order as long as the helper instructions are dependent-free (i.e. the helper instruction does not depend on other instructions for data). After the helpers are issued by IDU 130, helpers are typically processed by other processor units (e.g., execution unit, commit unit, data cache unit or the like).

Generally, in a processor, the load and store to/from memory storage are processed by memory interface units (e.g., data cache unit or the like). Typically, the data cache unit (DCU) maintains load queue (LQ) and store queue (SQ) for each read/write operation for the memory. The LQ and SQ store respective loads and stores to be processed. Complex instructions which are atomic can include load/store helper instructions as a part of the complex instruction function. When a complex instruction includes load/store helper then the DCU insures that the load/store helpers are processed only after all the previous loads/stores are processed (i.e. data read/written and completed). Thus, the LQ and SQ are empty before the helper loads/stores are processed in the respective queues i.e. the queue pointer for each of the queue points to the helper load/store, if any. Emptying the LQ and SQ before processing the helper load/store prevents any potential deadlock condition (or competition among other load/store) for corresponding memory locations and maintains the atomicity of the complex instruction. Following example illustrates a deadlock condition in a multiprocessor environment.

For example, a helper load LD14 is stored in entry 4 of a load queue (LQ1) of processor CPU1. Some older regular loads LD11, LD12 and LD13 are stored in entries 1, 2 and 3 of load queue LQ1. Similarly, a helper store ST14 is stored in entry 4 of a store queue SQ1 of CPU1 and some older regular stores ST11, ST12 and ST13 are stored in corresponding entries 1, 2 and 3 of the SQ1. For processor CPU2, helper load LD24 is stored in entry 4 and other older regular loads LD21, LD22 and LD23 are stored in entries 1, 2 and 3 of a load queue LQ2 belonging to CPU2. Similarly, helper store ST24 is stored in entry 4 and other older regular stores ST21, ST22 and ST23 are stored in respective entries 1, 2 and 3 of a store queue SQ2, belonging to CPU2.

Initially, LD14 gets processed by LQ1 in CPU1 before other older stores (i.e., ST11, ST12 and ST13) are processed. In such case, LD14 places an RTO (Read to Own) on the corresponding memory location, locks the location (to maintain the atomicity) on receiving the data corresponding to LD14 into CPU1. If load queue LQ2 in CPU2 processes the loads in the same manner, i.e. processes LD24 before other older stores (i.e., ST21, ST22 and ST23) then LD24 places an RTO (Read to Own) to lock the location so that it does not loose it when it receives data corresponding to LD24 into CPU2. In the present example, the address to which ST11 in CPU1 is to store data, matches the address of LD24 and the address to which ST21 in CPU2 is to store data, matches the address of LD14. In such case when ST11 gets issued by CPU1 (i.e., places an RTO to get ownership of it) then it cannot get the ownership of the corresponding location because CPU2 has locked the location.

ST11 (in CPU1) continues its attempts to access the location until it gets ownership of the location. Similarly when ST21 gets issued by CPU2 (i.e., places an RTO to get ownership of the location) it will not be able to get the ownership as CPU1 has locked the location. ST21 (in CPU2) keeps trying until it gets the ownership of the location. In this case, ST11 and ST21 can never get the ownership of the addressed location as LD24 and LD14 have locked those locations thus creating a deadlock condition. For the lock to be released, ST14 and ST24 must complete and for them to complete, all the prior older stores must complete (i.e., ST11, ST12, ST13 in CPU1 and ST21, ST22, ST23 in CPU2) to maintain TSO. Because ST11 and ST21 will never be able to complete, the lock will never be released as ST14 and ST24 will not get a chance to complete. One way to avoid such condition is to allow the load queue to issue helper load only after all the stores waiting in store queue have completed and store queue pointer in store queue is pointing to helper store, if any.

The atomicity of complex instructions is maintained by locking the locations corresponding to the load helper and releasing the lock only after determining that store helper has completed execution. The Commit Unit (CMU) retires helpers only after all the helpers have been executed without exceptions. Once DCU determines that the load and store portions of the helpers have completed, it unlocks the locations previously locked.

Complex Instruction Format

LDD—Load Double-Word

LDD [addr], %o0

Load double word instruction copies a double word from memory into an 'r'-register pair. The word at the effective memory address is copied into the even r register and word at effective memory address+4 is copied into the following odd-numbered 'r' register. The upper 32-bits of both even-numbered and odd-numbered 'r' registers are zero-filled. Load double word with rd=0 (i.e., rd referring to global register %g0) modifies only r[1](i.e., %g1). The least significant bit of the rd field in LDD instruction is unused and set to zero by software. Load double word instruction operates atomically. Table 3A illustrates an example of instruction format for load double word instruction according to an embodiment of the present invention.

TABLE 3A

An example of Load doubleword instruction format.

| 3130 | 29----25 | 24----19 | 18-14 | 13 | 12--------5 | 4-----0 |
|------|----------|----------|-------|-----|-------------|---------|
| 11   | XXXX0    | 000011   | rs1   | i=0 | —           | rs2     |
| 11   | XXXX0    | 000011   | rs1   | i=1 | simm_13     |         |
|      | %o0      |          |       |     | [addr]      |         |

Where 'X' represents either a zero or one (i.e., 'don't care' field).

Helpers for LDD

According to an embodiment of the present invention, load double word instruction includes three helpers. However, one skilled in the art will appreciate that complex instructions can include various numbers of helper instructions according to the architecture of the target processor (e.g., cycle time, internal and external resources used for the instruction, performance requirements or the like). Atomicity of LDD is preserved by H_LDX loading the entire 64-bit data in single execution.

1) H_LDX [addr], %tmp1

Upon issuance, the helper loads double word at memory address [addr] into its corresponding entry (i.e., the entry to which %tmp1 gets renamed to) in an integer working register file (IWRF). Upon retirement, the helper functions as a NOP i.e., the helper does not write any value from the integer working register file to the processor's integer architecture register file (IARF) because %tmp1 is used only to provide dependency and is not part of the IARF. Table 3B illustrates an example of the format of the helper according to an embodiment of the present invention.

TABLE 3B

The format of helper H_LDX.

| 31-30 | 29----25 | 24----19 | 18-----------------------0 |
|-------|----------|----------|----------------------------|
| 11    | rd       | 001011   | copy of incoming fields    |
|       | %tmp1    |          | [addr]                     |

2) H_SRLX %tmp1, 32, %o0

Upon issuance, the helper results in writing the upper 32-bits of %tmp1 (i.e. data stored in IWRF) into the lower 32-bits of %o0. The upper 32-bits of %o0 are zero filled. Table 3C illustrates an example of the format of the helper according to an embodiment of the present invention.

TABLE 3C

The format of helper H_SRLX

| 31-30 | 29----25 | 24----19 | 18---14 | 13-12 | 11---------------6 | 5---------0 |
|-------|----------|----------|---------|-------|--------------------|-------------|
| 10    | CCCC0    | 100110   | rs1     | 11    | C                  | 100000      |
|       | %o0      |          | %tmp1   |       |                    | 32(shcnt)   |

Where 'C' represents a copy of incoming bit or field (i.e. the copy of complex instruction). For example, bits 6–11 of helper H_SRLX are copy of bits 6–11 of the complex instruction (i.e., LDD in the present example).

3) H_SRL %tmp1, 0, %o1

Upon issuance, the helper results in writing the lower 32-bits of %tmp1 (i.e., data stored in IWRF) into the lower 32-bits of %o1. The upper 32-bits of %o1 are zero filled. Table 3D illustrates an example of the format of the helper according to an embodiment of the present invention.

TABLE 3D

The format of helper H_SRL

| 3130 | 29----25 | 24----19 | 18---14 | 13-12 | 11------------------5 | 4-----0 |
|------|----------|----------|---------|-------|-----------------------|---------|
| 10   | CCCC1    | 100110   | rs1     | 10    | C                     | 00000   |
|      | %o1      |          | %tmp1   |       |                       | 0       |

Where 'C' represents a copy of incoming bit or field (i.e. the copy of complex instruction). According to an embodiment of the present invention, the data loaded by LDD can be presented in any format required by the application executed in the processor. For example, when the data is to be present in a given format (e.g., big-endian, little-endian or the like) then the data can be converted into required format while executing helper H_LDX before writing it into %tmp1 register.

LDDA—Load Double-Word from Alternate Space

LDDA [addr]imm_asi, %o0—wherein the addr=([rs1]+[rs2]) or

LDDA [addr]%asi, %o0—wherein the addr=([rs1]+simm_13)

The load double word from alternate space instruction copies a double word from memory into an 'r'-register pair. The word at the effective memory address is copied into the even 'r' register and word at effective memory address+4 is copied into the following odd-numbered 'r' register. The upper 32-bits of both even-numbered and odd-numbered registers are zero-filled. Load double word instruction with rd=0(i.e., rd referring to global register %g0) modifies only r[1](i.e., %g1). The least significant bit of the 'rd' field in LDDA instruction is unused and set to zero by software. The instruction operates atomically. Table 4A illustrates an example of a format of load double word from alternate space instruction according to an embodiment of the present invention.

TABLE 4A

An example of Load double-word from alternate space instruction format.

| 31 30 | 29----25 | 24----19 | 18---14 | 13  | 12--------5 | 4-----0 |
|-------|----------|----------|---------|-----|-------------|---------|
| 11    | XXXX0    | 010011   | rs1     | i=0 | imm_asi     | rs2     |
| 11    | XXXX0 %o0 | 010011  | rs1     | i=1 | simm_13 [addr]%asi | |

Where 'X' represents either a zero or one (i.e., a 'don't care' field).

Helpers for LDDA

According to an embodiment of the present invention, load double word from alternate space instruction includes three helpers. However, one skilled in the art will appreciate that a complex instruction can include various numbers of helper instructions according to the architecture of the target processor (e.g., cycle time, internal and external resources used for the instruction, performance requirements or the like).

1) H_LDXA [addr]%asi, %tmp1

When issued, this helper loads double word at memory address [addr]%asi into its corresponding entry i.e., the entry to which %tmp1 gets renamed to, in IWRF. Upon retirement, the helper functions as NOP and does not write a value form IWRF into IARF because the register %tmp1 is used to provide dependency and is not part of IARF. Helper H_LDXA preserves the atomicity of LDDA instruction by loading the entire 64-bit data in one instance. Table 4B illustrates an example of a format of helper H_LDXA according to an embodiment of the present invention.

TABLE 4B

The format of helper H_LDXA.

| 31-30 | 29----25 | 24----19 | 18-----------------------0 |
|-------|----------|----------|----------------------------|
| 11    | rd %tmp1 | 011011   | copy of incoming fields [addr]%asi |

2) H_SRLX %tmp1, 32, %o0

When issued, this helper results in writing the upper 32-bits of %tmp1 i.e., the data stationed in IWRF/bypassed data, into the lower 32-bits of %o0. The upper 32-bits of %o0 are zero filled. Table 4C illustrates an example of a format of the helper according to an embodiment of the present invention.

TABLE 4C

The format of helper H_SRLX

| 31-30 | 29----25 | 24----19 | 18---14 | 13-12 | 11----------------6 | 5----------0 |
|-------|----------|----------|---------|-------|---------------------|--------------|
| 10    | CCCC0 %o0 | 100110  | rs1 %tmp1 | 11  | C                   | 100000 32(shcnt) |

Where 'C' represents a copy of incoming bit or field (i.e. the copy of complex instruction).

3) H_SRL %tmp1, 0, %o1

When issued, this helper results in writing the lower 32-bits of %tmp1 i.e., data stationed in IWRF/bypassed data, into the lower 32-bits of %o1. The upper 32-bits of %o1 are zero filled. Where 'C' represents a copy of incoming bit or field (i.e. the copy of complex instruction). Table 4D illustrates an example of the format of the helper according to an embodiment of the present invention.

TABLE 4D

The format of helper H_SRL

| 31-30 | 29----25 | 24----19 | 18---14 | 13-12 | 11----------------5 | 4---------0 |
|-------|----------|----------|---------|-------|---------------------|-------------|
| 10    | CCCC1 %o1 | 100110  | rs1 %tmp1 | 10  | C                   | 00000 0 (shcnt) |

Where 'C' represents a copy of incoming bit or field (i.e. the copy of complex instruction).

According to an embodiment of the present invention, the data loaded by LDDA can be presented in any format required by the application executed in the processor. For example, when the data is to be present in a given format (e.g., big-endian, little-endian or the like) then the data can be converted into required format while executing helper H_LDXA before writing it into %tmp1 register.

LDSTUB—Load Store Unsigned Byte

LDSTUB [addr], %o0

Load store unsigned byte instruction copies a byte from memory into rd and then rewrites the addressed byte in memory to all ones. The fetched byte is right justified in rd and zero filled on the left. The operation is performed atomically. In a multiprocessor system, two or more processors executing LDSTUB addressing the same byte can execute the instruction in an undefined but serial order. Table 5A illustrates an example of instruction format for load store unsigned byte instruction according to an embodiment of the present invention.

TABLE 5A

An example of Load store unsigned byte instruction format.

| 31-30 | 29-25 | 24----19 | 18---14 | 13  | 12--------------5 | 4-----0 |
|-------|-------|----------|---------|-----|-------------------|---------|
| 11    | rd    | 001101   | rs1     | i=0 | —                 | rs2     |
| 11    | rd %o0 | 001101  | rs1     | i=1 | simm_13 [addr]    |         |

LDSTUB is atomic instruction and the atomicity is preserved as follows:

a) LDSTUB is treated as serializing instruction with 'sync_after' semantics by IDU i.e., once IDU recognizes the LDSTUB instruction, IDU forwards all the instructions older to LDSTUB including LDSTUB and stalls on instructions younger to LDSTUB. IDU comes out of stall only after the live instruction table and store queue are empty. The live instruction table (LIT) monitors all the instructions currently being executed in the processor and an empty LIT represents that the execution of all the live instructions have been completed.

b) The DCU issues the load portion of the LDSTUB helpers only after all older loads waiting in LDQ have been issued and completed and all the stores older to it have also been completed.

c) The DCU forces a miss for the load portion of LDSTUB and forwards it to L2 cache. If the load hits in L2 cache and the data in L2 cache is in a modified state then DCU locks the location from where load is being performed so that remote load/stores are denied access to this location. If the load misses in L2 cache or hits in L2 cache but the data is in a state other than the 'modified' state then the DCU performs a RTO (read to own) for this load, locks the location from where load is being performed so that remote load/stores are denied access to this location.

d) The helpers are retired only after the execution of all the helpers corresponding to LDSTUB have been completed without exceptions.

Helpers for LDSTUB

According to an embodiment of the present invention, LDSTUB instruction includes four helpers. However, one skilled in the art will appreciate that complex instructions can include various numbers of helper instructions according to the architecture of the target processor (e.g., cycle time, internal and external resources used for the instruction, performance requirements or the like).

1) H_LDUB [addr], %tmp2

When issued, the helper copies a byte from the addressed memory location [addr] into its corresponding entry i.e., the entry to which %tmp2 gets renamed to in IWRF. The addressed byte is right justified and zero-filled on the left while it gets written into IWRF. Upon retirement, the helper functions as a NOP i.e., the helper does not write the value from in IWRF into IARF the reason being %tmp2 is used only to provide dependency and is not part of IARF. Table 5B illustrates an example of a format of helper H_LDUB according to an embodiment of the present invention.

TABLE 5B

The format of helper H_LDUB.

| 31-30 | 29----25 | 24---19 | 18----------------------0 |
|-------|----------|---------|---------------------------|
| 11 | rd %tmp2 | 000001 | copy of incoming fields [addr] |

2) H_SUB %g0, 1, %tmp1

When issued, the helper results in writing '1' into its corresponding entry i.e., the entry to which %tmp1 gets renamed to in IWRF. Upon retirement, the helper functions as NOP i.e., the helper does not write the value from IWRF into IARF because %tmp1 is used only to provide dependency and is not part of IARF. Table 5C illustrates an example of a format of the helper according to an embodiment of the present invention.

TABLE 5C

The format of helper H_SUB

| 31-30 | 29----25 | 24----19 | 18-14 | 13--------------------0 |
|-------|----------|----------|-------|--------------------------|
| 10 | rd %tmp1 | 000100 | rs1 %g0 | 1 0 0000 0000 0001 |

TABLE 5D

The format of helper H_STB.

| 31-30 | 29----25 | 24---19 | 18----------------------0 |
|-------|----------|---------|---------------------------|
| 11 | rd %tmp1 | 000101 | copy of incoming fields [addr] |

4) H_OR %tmp2, %g0, %o0

When issued, this helper results in writing the value in %tmp2 into its corresponding entry i.e., the entry to which %o0 gets renamed to in IWRF. Upon retirement, the helper writes the value in IWRF into %o0 which is a part of IARF. 5E illustrates an example of a format of helper H_OR according to an embodiment of the present invention.

TABLE 5E

The format of helper H_OR.

| 31-30 | 29------25 | 24----19 | 18---14 | 13 | 12------------------5 | 4--------0 |
|-------|------------|----------|---------|----|-----------------------|------------|
| 10 | rd %o0 | 000010 | rs1 %tmp2 | 0 | C | rs2 %g0 |

Where 'C' represents a copy of incoming bit or field (i.e. the copy of complex instruction).

LDSTUBA—Load Store Unsigned Byte from Alternate Space

LDSTUBA [addr]imm_asi, %o0—wherein addr=([rs1]+ [rs2]) or

LDSTUBA [addr]%asi, %o0—wherein addr=([rs1]+ simm_13)

The load store unsigned byte from alternate space instruction copies a byte from memory into register 'rd' and then rewrites the addressed byte in memory to all ones. The fetched byte is right justified in 'rd' and zero filled on the left. The operation is performed atomically. In a multiprocessor system, two or more processors executing LDSTUBA addressing the same byte are executed in an undefined but serial order. Table 6A illustrates an example of instruction format for load store unsigned byte from alternate space instruction according to an embodiment of the present invention.

TABLE 6A

An example of Load store unsigned byte from alternate space instruction format.

| 31-30 | 29------25 | 24----19 | 18---14 | 13 | 12----------------5 | 4--------0 |
|-------|------------|----------|---------|----|---------------------|------------|
| 11 | rd | 0011101 | rs1 | i=0 | imm_asi | rs2 |
| 11 | rd %o0 | 0011101 | rs1 | i=1 | simm_13 [addr]%asi | |

LDSTUBA is atomic instruction and the atomicity is preserved as follows:

a) LDSTUBA is treated as serializing instruction with 'sync_after' semantics by IDU i.e., once IDU recognizes the LDSTUBA instruction, IDU forwards all the instructions older to LDSTUBA including LDSTUBA and stalls on instructions younger to LDSTUBA. IDU comes out of stall only after the LIT and store queue are empty. An empty LIT represents that the execution of all the live instructions have been completed.

b) The DCU issues the load portion of the LDSTUBA helpers only after all older loads waiting in LDQ have been issued and completed and all the stores older to it have also been completed.

c) The DCU forces a miss for the load portion of LDSTUBA and forwards it to L2 cache. If the load hits in L2 cache and the data in L2 cache is in a modified state then DCU locks the location from where load is being performed so that remote load/stores are denied access to this location. If the load misses in L2 cache or hits in L2 cache but the data is in a state other than the 'modified' state then the DCU performs a RTO (read to own) for this load, locks the location from where load is being performed so that remote load/stores are denied access to this location.

d) The helpers are retired only after the execution of all the helpers corresponding to LDSTUBA have been completed without exceptions.

Helpers for LDSTUBA

According to an embodiment of the present invention, LDSTUBA instruction includes four helpers. However, one skilled in the art will appreciate that complex instructions can include various numbers of helper instructions according to the architecture of the target processor (e.g., cycle time, internal and external resources used for the instruction, performance requirements or the like).

1) H_LDUBA [addr]%asi, %tmp2

When issued, the helper copies a byte from the addressed memory location [addr]%asi into its corresponding entry i.e., the entry to which %tmp2 gets renamed to in IWRF. The addressed byte is right justified and zero-filled on the left while it gets written into IWRF. Upon retirement, the helper functions as NOP and does not write the value from IWRF into IARF because %tmp2 is used only to provide dependency and is not part of IARF. Table 6B illustrates an example of a format of helper H_LDUBA according to an embodiment of the present invention.

TABLE 5B

The format of helper H_LDUBA.

| 31-30 | 29----25 | 24----19 | 18-----------------------0 |
|---|---|---|---|
| 11 | rd %tmp2 | 010001 | copy of incoming fields [addr]%asi |

2) H_SUB %g0, 1, %tmp1

When issued, this helper results in writing 1 into its corresponding entry i.e., the entry to which %tmp1 gets renamed to in IWRF. Upon retirement, the helper functions as NOP and does not write the value from IWRF into IARF because %tmp1 is used only to provide dependency and is not part of IARF. Table 6C illustrates an example of a format of the helper according to an embodiment of the present invention.

TABLE 6C

The format of helper H_SUB

| 31-30 | 29----25 | 24----19 | 18-14 | 13--------------------0 |
|---|---|---|---|---|
| 10 | rd %tmp1 | 000100 | rs1 %g0 | 1 0 0000 0000 0001 |

3) H_STBA %tmp1, [addr]%asi

Upon issuance, the helper stores the addressed memory location [addr]%asi with all 1's. Table 6D illustrates an example of a format of helper H_STBA according to an embodiment of the present invention.

TABLE 6D

The format of helper H_STBA

| 31-30 | 29----25 | 24----19 | 18-----------------------0 |
|---|---|---|---|
| 11 | rd %tmp1 | 010101 | copy of incoming fields [addr]%asi |

4) H_OR %tmp2, %g0, %o0

Upon issuance, the helper results in writing the value in %tmp2 into its corresponding entry i.e., the entry to which %o0 gets renamed to in IWRF. When retired, the helper writes the value in IWRF into %o0 which is part of IARF. 6E illustrates an example of a format of helper H_OR according to an embodiment of the present invention.

TABLE 6E

The format of helper H_OR.

| 31-30 | 29------25 | 24----19 | 18---14 | 13 | 12-----------------5 | 4--------0 |
|---|---|---|---|---|---|---|
| 10 | rd %o0 | 000010 | rs1 %tmp2 | 0 | C | rs2 %g0 |

Where 'C' represents a copy of incoming bit or field (i.e. the copy of complex instruction).

SWAP—Swap Register with Memory
SWAP [addr], %o0

The SWAP instruction exchanges the lower 32 bits of %rd with the contents of the word at the addressed memory location. The upper 32 bits of %rd are set to zero. The SWAP instruction operates atomically. Table 7A illustrates an example of instruction format for SWAP instruction according to an embodiment of the present invention.

TABLE 7A

An example of SWAP instruction format.

| 31-30 | 29------25 | 24----19 | 18---14 | 13 | 12-----------------5 | 4--------0 |
|---|---|---|---|---|---|---|
| 11 | rd | 001111 | rs1 | i=0 | — | rs2 |
| 11 | rd %o0 | 001111 | rs1 | i=1 | simm_13 [addr] | |

SWAP is atomic instruction and the atomicity is preserved as follows:

a) SWAP is treated as serializing instruction with 'sync-after' semantics by IDU i.e., once IDU recognizes the SWAP instruction, IDU forwards all the instructions older to SWAP including SWAP and stalls on instructions younger to SWAP. IDU comes out of stall only after the live instruction table (LIT) and store queue are empty.

b) The DCU issues the load portion of the SWAP helpers only after all older loads waiting in LDQ have been issued and completed and all the stores older to it have also been completed.

c) The DCU forces a miss for the load portion of SWAP and forwards it to L2 cache. If the load hits in L2 cache and the data in L2 cache is in a modified state then DCU locks the location from where load is being performed so that remote load/stores are denied access to this location. If the load misses in L2 cache or hits in L2 cache but the data is in a state other than the 'modified' state then the DCU performs a RTO (read to own) for this load, locks the location from where load is being performed so that remote load/stores are denied access to this location.

d) The helpers are retired only after the execution of all the helpers corresponding to SWAP have been completed without exceptions.

Helpers for SWAP

According to an embodiment of the present invention, SWAP instruction includes three helpers. However, one skilled in the art will appreciate that complex instructions can include various numbers of helper instructions according to the architecture of the target processor (e.g., cycle time, internal and external resources used for the instruction, performance requirements or the like).

1) H_LDUW [addr], %tmp1

When issued, the helper copies a byte from the addressed memory location [addr] into its corresponding entry i.e., the entry to which %tmp1 gets renamed to in IWRF. The addressed word is right justified and zero-filled on the left while it gets written into IWRF. Upon retirement, the helper functions as a NOP i.e., the helper does not write the value in IWRF into IARF because %tmp1 is used to provide dependency and is not part of IARF. Table 7B illustrates an example of a format of helper H_LDUW according to an embodiment of the present invention.

TABLE 7B

The format of helper H_LDUW.

| 31-30 | 29----25 | 24---19 | 18----------------------0 |
|---|---|---|---|
| 11 | rd %tmp1 | 000000 | copy of incoming fields [addr] |

2) H_STW %o0, [addr]

When issued, the helper results in writing the lower 32-bit word in %o0 into memory at address [addr]. Table 7C illustrates an example of a format of helper H_STW according to an embodiment of the present invention.

TABLE 7C

The format of helper H_STW.

| 31-30 | 29----25 | 24---19 | 18----------------------0 |
|---|---|---|---|
| 11 | rd %o0 | 000100 | copy of incoming fields [addr] |

3) H_OR %tmp1, %g0, %o0

When issued, the helper results in writing the value in %tmp1 into its corresponding entry i.e., the entry to which %o0 gets renamed to in IWRF. Upon retirement, the helper writes the value in IWRF into %o0 which is part of IARF. Table 7D illustrates an example of a format of helper H_OR according to an embodiment of the present invention.

TABLE 7D

The format of helper H_OR.

| 31-30 | 29------25 | 24----19 | 18---14 | 13 | 12----------------5 | 4-------0 |
|---|---|---|---|---|---|---|
| 10 | rd %o0 | 000010 | rs1 %tmp1 | 0 | C | rs2 %g0 |

Where 'C' represents a copy of incoming bit or field (i.e. the copy of complex instruction).

SWAPA—Swap Register with Alternate Space Memory
SWAPA [addr]%asi, %o0—where addr=([rs1]+simm_13) or SWAPA [addr]imm_asi, %o0—where addr=([rs1]+[rs2])

SWAPA instruction exchanges the lower 32 bits of %rd with the contents of the word at the addressed memory location. The upper 32 bits of %rd are set to zero. SWAPA instruction operates atomically. SWAPA is an atomic instruction and its atomicity is maintained in the same manner as SWAP instruction described previously herein. Table 8A illustrates an example of instruction format for SWAPA instruction according to an embodiment of the present invention.

TABLE 8A

An example of SWAPA instruction format.

| 31-30 | 29------25 | 24----19 | 18---14 | 13 | 12----------------5 | 4-------0 |
|---|---|---|---|---|---|---|
| 11 | rd | 011111 | rs1 | i=0 | imm_asi | rs2 |
| 11 | rd %o0 | 011111 | rs1 | i=1 | simm_13 [addr]%asi | |

Helpers for SWAPA

According to an embodiment of the present invention, SWAPA instruction includes three helpers. However, one skilled in the art will appreciate that complex instructions can include various numbers of helper instructions according to the architecture of the target processor (e.g., cycle time, internal and external resources used for the instruction, performance requirements or the like).

1) H_LDUWA [addr]%asi, %tmp1

When issued, the helper copies a byte from the addressed memory location [addr]%asi into its corresponding entry i.e., the entry to which %tmp1 gets renamed to in IWRF. The addressed word is right justified and zero-filled on the left while it gets written into IWRF. Upon retirement, the helper functions as NOP i.e., the helper does not write the value in IWRF into IARF because %tmp1 is used to provide dependency and is not part of IARF. Table 8B illustrates an example of a format of helper H_LDUWA according to an embodiment of the present invention.

TABLE 8B

The format of helper H_LDUWA.

| 31-30 | 29----25 | 24---19 | 18----------------------0 |
|---|---|---|---|
| 11 | rd %tmp1 | 010000 | copy of incoming fields [addr]%asi |

2) H_STWA %o0, [addr]%asi

When issued, the helper results in writing the lower 32-bit word in %o0 into memory at address [addr]%asi. Table 8C illustrates an example of a format of helper H_STWA according to an embodiment of the present invention.

TABLE 8C

The format of helper H_STWA.

| 31-30 | 29----25 | 24---19 | 18----------------------0 |
|---|---|---|---|
| 11 | rd %o0 | 010100 | copy of incoming fields [addr]%asi |

3) H_OR %tmp1, %g0, %o0

When issued, the helper results in writing the value in %tmp1 into its corresponding entry i.e., the entry to which %o0 gets renamed to in IWRF. Upon retirement, the helper writes the value in IWRF into %o0 which is part of IARF. Table 8D illustrates an example of a format of helper H_OR according to an embodiment of the present invention.

TABLE 8D

The format of helper H_OR.

| 31-30 | 29------25 | 24----19 | 18---14 | 13 | 12----------------5 | 4-------0 |
|---|---|---|---|---|---|---|
| 10 | rd %o0 | 000010 | rs1 %tmp1 | 0 | C | rs2 %g0 |

Where 'C' represents a copy of incoming bit or field (i.e. the copy of complex instruction).

CASA(i=0)—Compare and Swap Word from Alternate Space, i=0
CASA [%i0]imm_asi, %i1, %o0

The instruction compares the low-order 32-bits of %rs2 with a word in memory pointed to by the word address [%rs1]imm_asi. If the values are equal then the low-order 32-bits of %rd are swapped with the contents of the memory word pointed to by the address [%rs1]imm_asi and the higher order 32-bits of %rd are set to zero. If the values are not equal, the memory location remains unchanged but the zero-extended contents of the memory word pointed to by [%rs 1]imm_asi replace the low-order 32-bits of %rd and high order 32-bits of %rd are set to zero. The instruction operates atomically. A compare-and-swap operates as store operation on either of a new value from %rd or on the previous value in memory. The addressed location must be writable even if the values in memory and %rs2 are not equal. Table 9A illustrates an example of instruction format for CASA(i=0) instruction according to an embodiment of the present invention.

TABLE 9A

An example of CASA(i=0) instruction format.

| 31-30 | 29------25 | 24----19 | 18---14 | 13 | 12-----------------5 | 4-------0 |
|---|---|---|---|---|---|---|
| 11 | rd<br>%o0 | 111100 | rs1 | 0 | imm_asi<br>[addr]imm_asi | rs2<br>%i1 |

CASA(i=0) is atomic instruction and its atomicity is preserved as follows:

a) CASA(i=0) is treated as serializing instruction with 'sync_after' semantics by IDU i.e., once IDU recognizes the CASA(i=0) instruction, IDU forwards all the instructions older to CASA(i=0) including CASA(i=0) and stalls on instructions younger to CASA(i=0). IDU comes out of stall only after the live instruction table (LIT) and store queue are empty.

b) The DCU issues the load portion of the CASA(i=0) helpers only after all older loads waiting in LDQ have been issued and completed and all the stores older to it have also been completed.

c) The DCU forces a miss for the load portion of CASA(i=0) and forwards it to L2 cache. If the load hits in L2 cache and the data in L2 cache is in a modified state then DCU locks the location from where load is being performed so that remote load/stores are denied access to this location. If the load misses in L2 cache or hits in L2 cache but the data is in a state other than the 'modified' state then the DCU performs a RTO (read to own) for this load, locks the location from where load is being performed so that remote load/stores are denied access to this location.

d) The helpers are retired only after the execution of all the helpers corresponding to CASA(i=0) have been completed without exceptions.

Helpers for CASA(i=0)

According to an embodiment of the present invention, CASA(i=0) instruction includes six helpers. However, one skilled in the art will appreciate that complex instructions can include various numbers of helper instructions according to the architecture of the target processor (e.g., cycle time, internal and external resources used for the instruction, performance requirements or the like).

1) H_OR %g0, %o0, %tmp2

When issued, the helper results in writing the value in %o0 into its corresponding entry i.e., the entry to which %tmp2 gets renamed to in IWRF. The helper functions as a NOP upon retirement i.e., it does not write the value in IWRF into IARF because %tmp2 is used to provide dependency and is not part of IARF. Table 9B illustrates an example of a format of helper H_OR according to an embodiment of the present invention.

TABLE 9B

The format of helper H_OR.

| 31-30 | 29------25 | 24----19 | 18---14 | 13 | 12-----------------5 | 4-------0 |
|---|---|---|---|---|---|---|
| 10 | rd<br>%tmp2 | 000010 | rs1<br>%g0 | 0 | C | rs2<br>%o0 |

Where 'C' represents a copy of incoming bit or field (i.e. the copy of complex instruction).

2) H_LDUWA [addr]imm_asi, %tmp1

When issued, the helper copies a word from the addressed memory location [addr]%asi (i.e., ([%i0]+[%g0])%asi) into its corresponding entry, the entry to which %tmp1 gets renamed to, in IWRF. The addressed word is right justified and zero-filled on the left while it gets written into IWRF. The helper functions as a NOP upon retirement i.e., does not write the value in IWRF into IARF because %tmp1 is used only to provide dependency and is not part of IARF. Table 9C illustrates an example of a format of helper H_LDUWA according to an embodiment of the present invention.

TABLE 9C

The format of helper H_LDUWA.

| 31-30 | 29------25 | 24-----19 | 18---14 | 13-------------------5 | 4-----0 |
|---|---|---|---|---|---|
| 11 | rd<br>%tmp1 | 010000 | rs1<br>%i0 | C | rs2<br>%g0 |

Where 'C' represents a copy of incoming bit or field (i.e. the copy of complex instruction).

3) H_SUBcc %tmp1, %i1, %g0

When issued, the helper compares the value in %tmp1 i.e., 64-bit data stored in one of the entries of IWRF to which %tmp1 is renamed to, and %i1 and writes the difference into its corresponding entry in IWRF i.e., the entry to which %g0 gets renamed to. It also modifies temporary condition codes (both icc and xcc portion of it) by writing the modified value (8-bit value, {xcc[3:0],icc[3:0]}) into its corresponding entry in CWRF (i.e., the entry to which %tmpcc (temporary condition code register) gets renamed to). The helper functions as NOP upon retirement i.e., it does not write the value in IWRF into IARF because %g0 is read only register and is used only to satisfy instruction format and the helper also does not write the value in CWRF into CARF because reason being %tmpcc is used only to provide dependency and is not part of CARF. This helper won't result in any exceptions. Table 9D illustrates an example of a format of helper H_SUBcc according to an embodiment of the present invention.

TABLE 9D

The format of helper H_SUBcc.

| 31-30 | 29------25 | 24----19 | 18---14 | 13 | 12-----------------5 | 4-------0 |
|---|---|---|---|---|---|---|
| 10 | rd<br>%g0 | 010100 | rs1<br>%tmp1 | 0 | C | rs2<br>%i1 |

Where 'C' represents a copy of incoming bit or field (i.e. the copy of complex instruction).

4) H_MOVNE %tmp1, %tmp2

When this helper is issued, the helper determines the value of tmpcc (in the present case, tmpicc.Z) and if (tmpicc.Z=0) the contents of %tmp1 are written into %tmp2, if (tmpicc.Z=1) then the contents of %tmp2 remains unchanged. The helper functions as NOP upon retirement i.e., it does not write the value in IWRF into IARF. Table 9E illustrates an example of a format of helper H_MOVNE according to an embodiment of the present invention.

TABLE 9E

The format of helper H_MOVNE.

| 31-30 | 29----25 | 24----19 | 18 | 17--14 | 13 | 12 | 11 | 10-----5 | 4-----0 |
|---|---|---|---|---|---|---|---|---|---|
| 10 | rd %tmp2 | 101100 | 1 | 1000 | 0 | 0 | 0 | C | rs2 %g0 |

Where 'C' represents a copy of incoming bit or field (i.e. the copy of complex instruction).

5) H_STWA %tmp2, [addr]imm_asi

When issued, the helper results in storing the lower 32-bits of %tmp2 into memory location identified by the word address [addr]imm_asi (i.e., ([%i0]+[%g0])imm_asi). Table 9F illustrates an example of a format of helper H_STWA according to an embodiment of the present invention.

TABLE 9F

The format of helper H_STWA.

| 31-30 | 29------25 | 24-----19 | 18---14 | 13------------------5 | 4-----0 |
|---|---|---|---|---|---|
| 11 | rd %tmp2 | 010100 | rs1 %i0 | C | rs2 %g0 |

Where 'C' represents a copy of incoming bit or field (i.e. the copy of complex instruction).

6) H_OR %tmp1, %g0, %o0

When issued, the helper results in writing the value in %tmp1 into its corresponding entry i.e., the entry to which %o0 gets renamed to in IWRF. Upon retirement, the helper writes the value in IWRF into %o0 which is part of IARF. Table 9G illustrates an example of a format of helper H_OR according to an embodiment of the present invention.

TABLE 9G

The format of helper H_OR.

| 31-30 | 29------25 | 24----19 | 18---14 | 13 | 12------------------5 | 4-------0 |
|---|---|---|---|---|---|---|
| 10 | rd %o0 | 000010 | rs1 %tmp1 | 0 | C | rs2 %g0 |

Where 'C' represents a copy of incoming bit or field (i.e. the copy of complex instruction).

CASA(i=1)—Compare and Swap Word from Alternate Space, i=1
CASA [%i0]%asi, %i1, %o0

The instruction compares the low-order 32-bits of %rs2 with a word in memory pointed to by the word address [%rs1 ]%asi. If the values are equal, the low-order 32-bits of %rd are swapped with the contents of the memory word identified by the address [%rs1]%asi and the higher order 32-bits of %rd are set to zero. If the values are not equal, the memory location remains unchanged however the zero-extended contents of the memory word pointed to by [%rs1] %asi replace the low-order 32-bits of %rd and high-order 32-bits of %rd are set to zero. It operates atomically. A compare-and-swap operation functions like a store operation of, either a new value from %rd or the previous value in memory. The addressed location must be writable even if the values in memory and %rs2 are not equal. CASA(i=1) is atomic instruction and its atomicity is preserved in the same manner as instruction CASA(i=1). Table 10A illustrates an example of a format of CASA(i=1) instruction according to an embodiment of the present invention.

TABLE 10A

An example of CASA(i=1) instruction format.

| 31-30 | 29------25 | 24----19 | 18---14 | 13 | 12------------------5 | 4-------0 |
|---|---|---|---|---|---|---|
| 11 | rd %o0 | 111100 | rs1 | 1 | [addr]i%asi | rs2 %i1 |

Helpers for CASA(i=1)

According to an embodiment of the present invention, CASA(i=1) instruction includes six helpers. However, one skilled in the art will appreciate that complex instructions can include various numbers of helper instructions according to the architecture of the target processor (e.g., cycle time, internal and external resources used for the instruction, performance requirements or the like).

1) H_OR %g0, %o0, %tmp2

When issued, the helper results in writing the value in %o0 into its corresponding entry i.e., the entry to which %tmp2 gets renamed to in IWRF. The helper functions as NOP i.e., it does not write the value in IWRF into IARF because %tmp2 is used to provide dependency and is not part of IARF. Table 10B illustrates an example of a format of helper H_OR according to an embodiment of the present invention.

TABLE 10B

The format of helper H_OR.

| 31-30 | 29------25 | 24----19 | 18---14 | 13 | 12--------------5 | 4----0 |
|---|---|---|---|---|---|---|
| 10 | rd %tmp2 | 000010 | rs1 %g0 | 0 | C | rs2 %o0 |

Where 'C' represents a copy of incoming bit or field (i.e. the copy of complex instruction).

2) H_LDUWA [addr]%asi, %tmp1

When issued, the helper copies a word from the addressed memory location [addr]%asi (i.e., ([%i0]+sign_ext(simm 13)) into its corresponding entry, the entry to which %tmp1 gets renamed to, in IWRF. The addressed word is right justified and zero-filled on the left while it gets written into IWRF. The helper functions as NOP upon retirement i.e., it does not write the value in IWRF into IARF because %tmp1 is used only to provide dependency and is not part of IARF. Table 10C illustrates an example of a format of helper H_LDUWA according to an embodiment of the present invention.

TABLE 10C

The format of helper H_LDUWA.

| 31-30 | 29----25 | 24----19 | 18-14 | 13--------------------0 |
|---|---|---|---|---|
| 11 | rd %tmp1 | 010000 | rs1 %i0 | C0 0000 0000 0000 |

Where 'C' represents a copy of incoming bit or field (i.e. the copy of complex instruction).

3) H_SUBcc %tmp1, %i1, %g0

When issued, the helper compares the value in %tmp1 i.e., 64-bit data stored in one of the entries of IWRF to which %tmp1 is renamed to, and %i1 and writes the difference into its corresponding entry in IWRF i.e., the entry to which %g0 gets renamed to. It also modifies temporary condition codes (both icc and xcc portion of it) by writing the modified value (8-bit value, {xcc[3:0], icc[3:0]}) into its corresponding entry in CWRF (i.e., the entry to which %tmpcc (temporary condition code register) gets renamed to). The helper functions as NOP upon retirement i.e., it does not write the value in IWRF into IARF because %g0 is read only register and is used only to satisfy instruction format and the helper also does not write the value in CWRF into CARF because reason being %tmpcc is used only to provide dependency and is not part of CARF. This helper won't result in any exceptions. Table 10D illustrates an example of a format of helper H_SUBcc according to an embodiment of the present invention.

TABLE 10D

The format of helper H_SUBcc.

| 31-30 | 29------25 | 24----19 | 18---14 | 13 | 12-----------------5 | 4-------0 |
|---|---|---|---|---|---|---|
| 10 | rd | 010100 | rs1 | 0 | C | rs2 |
|  | %g0 |  | %tmp1 |  |  | %i1 |

Where 'C' represents a copy of incoming bit or field (i.e. the copy of complex instruction).

4) H_MOVNE %tmp1, %tmp2

When this helper is issued, the helper determines the value of tmpcc (in the present case, tmpicc.Z) and if (tmpicc.Z=0) the contents of %tmp1 are written into %tmp2, if (tmpicc.Z=1) then the contents of %tmp2 remains unchanged. The helper functions as NOP upon retirement i.e., it does not write the value in IWRF into IARF. Table 10E illustrates an example of a format of helper H_MOVNE according to an embodiment of the present invention.

TABLE 10E

The format of helper H_MOVNE.

| 31-30 | 29----25 | 24----19 | 18 | 17--14 | 13 | 12 | 11 | 10-----5 | 4-----0 |
|---|---|---|---|---|---|---|---|---|---|
| 10 | rd | 101100 | 1 | 1000 | 0 | 0 | 0 | C | rs2 |
|  | %tmp2 |  |  |  |  |  |  |  | %tmp1 |

Where 'C' represents a copy of incoming bit or field (i.e. the copy of complex instruction).

5) H_STWA %tmp2, [addr]%asi

When issued, the helper results in storing the lower 32-bits of %tmp2 into memory location identified by the word address [addr]%asi (i.e., ([%i0]+sign_ext(simm13)) imm_asi). Table 10F illustrates an example of a format of helper H_STWA according to an embodiment of the present invention.

TABLE 10F

The format of helper H_STWA.

| 31-30 | 29----25 | 24----19 | 18-14 | 13--------------------0 |
|---|---|---|---|---|
| 11 | rd | 010100 | rs1 | C0 0000 0000 0000 |
|  | %tmp2 |  | %i0 |  |

Where 'C' represents a copy of incoming bit or field (i.e. the copy of complex instruction).

6) H_OR %tmp1, %g0, %o0

When issued, the helper results in writing the value in %tmp1 into its corresponding entry i.e., the entry to which %o0 gets renamed to in IWRF. Upon retirement, the helper writes the value in IWRF into %o0 which is part of IARF. Table 10G illustrates an example of a format of helper H_OR according to an embodiment of the present invention.

TABLE 10G

The format of helper H_OR.

| 31-30 | 29------25 | 24----19 | 18---14 | 13 | 12-----------------5 | 4-------0 |
|---|---|---|---|---|---|---|
| 10 | rd | 000010 | rs1 | 0 | C | rs2 |
|  | %o0 |  | %tmp1 |  |  | %g0 |

Where 'C' represents a copy of incoming bit or field (i.e. the copy of complex instruction).

CASXA(i=0)—Compare and Swap Doubleword from Alternate Space, i=0

CASXA [%i0]imm_asi, %i1, %o0

The instruction compares the value in %rs2 with the doubleword in memory pointed to by the doubleword address [%rs1]imm asi. If the values are equal the value in %rd is swapped with the contents of the memory doubleword pointed to by the address [%rs1]imm_asi. If the values are not equal, the memory location remains unchanged but the memory doubleword pointed to by [%rs1]imm_asi replaces the value in %rd. It operates atomically and the atomicity of the instruction is maintained in the same manner as CASA(i=0) as described previously herein. The compare-and-swap operation functions as a store, either of a new value from %rd or of the previous value in memory. The addressed location must be writable even if the values in memory and %rs2 are not equal.) Table 11A illustrates an example of a format of CASXA(i=0) instruction according to an embodiment of the present invention.

TABLE 10A

An example of CASXA(i-0) instruction format.

| 31-30 | 29-----25 | 24----19 | 18---14 | 13 | 12-----------------5 | 4------0 |
|---|---|---|---|---|---|---|
| 11 | rd | 111110 | rs1 | 0 | imm_asi | rs2 |
|  | %o0 |  | [addr]imm_asi |  |  | %i1 |

Helpers for CASXA(i=0)

According to an embodiment of the present invention, CASXA(i=0) instruction includes six helpers. However, one skilled in the art will appreciate that complex instructions can include various numbers of helper instructions according to the architecture of the target processor (e.g., cycle time, internal and external resources used for the instruction, performance requirements or the like).

1) H_OR %g0, %o0, %tmp2

When issued, the helper results in writing the value in %o0 into its corresponding entry i.e., the entry to which %tmp2 gets renamed to in IWRF. The helper functions as NOP upon retirement i.e., it does not write the value in IWRF into IARF because %tmp2 is used to provide dependency and is not part of IARF. Table 11B illustrates an example of a format of helper H_OR according to an embodiment of the present invention.

TABLE 11B

The format of helper H_OR.

| 31-30 | 29----25 | 24----19 | 18-14 | 13 | 12-----5 | 4---0 |
|---|---|---|---|---|---|---|
| 10 | rd | 000010 | rs1 | 0 | C | rs2 |
|  | %tmp2 |  | %g0 |  |  | %o0 |

Where 'C' represents a copy of incoming bit or field (i.e. the copy of complex instruction).

2) H_LDXA [addr]imm_asi, %tmp1

When issued, the helper copies a doubleword from the addressed memory location [addr]%asi (i.e., ([%i0]+[%g0])%asi) into its corresponding entry (i.e., the entry to which %tmp1 gets renamed to) in IWRF. The helper functions as NOP i.e., it does not write the value in IWRF into IARF because %tmp1 is used only to provide dependency and is not part of IARF. Table 11C illustrates an example of a format of helper H_LDXA according to an embodiment of the present invention.

TABLE 11C

The format of helper H_LDXA.

| 31-30 | 29----25 | 24----19 | 18-14 | 13--------5 | 4---0 |
|---|---|---|---|---|---|
| 11 | rd %tmp1 | 011011 | rs1 %i0 | C | rs2 %g0 |

Where 'C' represents a copy of incoming bit or field (i.e. the copy of complex instruction).

3) H_SUBcc %tmp1, %i1, %g0

When issued, the helper compares the value in %tmp1 i.e., 64-bit data stored in one of the entries of IWRF to which %tmp1 is renamed to, and %i1 and writes the difference into its corresponding entry in IWRF i.e., the entry to which %g0 gets renamed to. It also modifies temporary condition codes (both icc and xcc portion of it) by writing the modified value (8-bit value, {xcc[3:0], icc[3:0]}) into its corresponding entry in CWRF (i.e., the entry to which %tmpcc (temporary condition code register) gets renamed to). The helper functions as NOP i.e., it does not write the value in IWRF into IARF because %g0 is read only register and is used only to satisfy instruction format and the helper also does not write the value in CWRF into CARF because reason being %tmpcc is used only to provide dependency and is not part of CARF. This helper won't result in any exceptions. Table 11D illustrates an example of a format of helper H_SUBcc according to an embodiment of the present invention.

TABLE 11D

The format of helper H_SUBcc.

| 31-30 | 29-25 | 24----19 | 18---14 | 13 | 12-----5 | 4---0 |
|---|---|---|---|---|---|---|
| 10 | rd %g0 | 010100 | rs1 %tmp1 | 0 | C | rs2 %i1 |

Where 'C' represents a copy of incoming bit or field (i.e. the copy of complex instruction).

4) H_MOVNE %tmp1, %tmp2

When this helper is issued, the helper determines the value of tmpcc (in the present case, tmpicc.Z) and if tmpicc.Z=0, the contents of %tmp1 are written into %tmp2, if tmpicc.Z=1, then the contents of %tmp2 remains unchanged. The helper functions as NOP upon retirement i.e., it does not write the value in IWRF into IARF. Table 11E illustrates an example of a format of helper H_MOVNE according to an embodiment of the present invention.

TABLE 11E

The format of helper H_MOVNE.

| 31-30 | 29----25 | 24---19 | 18 | 17-14 | 13 | 12 | 11 | 10-------5 | 4-----0 |
|---|---|---|---|---|---|---|---|---|---|
| 10 | rd %tmp2 | 101100 | 1 | 1000 | 0 | 1 | 0 | C | rs2 %tmp1 |

Where 'C' represents a copy of incoming bit or field (i.e. the copy of complex instruction).

5) H_STXA %tmp2, [addr]imm_asi

When issued, the helper results in storing the doubleword in %tmp2 into memory location pointed by the doubleword address [addr]imm_asi (i.e., ([%i0]+[%g0])imm_asi). Table 11F illustrates an example of a format of helper H_STXA according to an embodiment of the present invention.

TABLE 11F

The format of helper H_STWA.

| 31-30 | 29---25 | 24---19 | 18-14 | 13--------5 | 4----0 |
|---|---|---|---|---|---|
| 11 | rd %tmp2 | 011110 | rs1 %i0 | C | rs2 %g0 |

Where 'C' represents a copy of incoming bit or field (i.e. the copy of complex instruction).

6) H_OR %tmp 1, %g0, %o0

When issued, the helper results in writing the value in %tmp1 into its corresponding entry i.e., the entry to which %o0 gets renamed to in IWRF. Upon retirement, the helper writes the value in IWRF into %o0 which is part of IARF. Table 11G illustrates an example of a format of helper H_OR according to an embodiment of the present invention.

TABLE 11G

The format of helper H_OR.

| 31-30 | 29-25 | 24---19 | 18---14 | 13 | 12----5 | 4---0 |
|---|---|---|---|---|---|---|
| 10 | rd %o0 | 000010 | rs1 %tmp1 | 0 | C | rs2 %g0 |

Where 'C' represents a copy of incoming bit or field (i.e. the copy of complex instruction).

CASXA(i=1)—Compare and Swap Doubleword from Alternate Space i=1

CASXA [%i0]%asi, %i1, %o0

The instruction compares the value in %rs2 with the doubleword in memory pointed to by the doubleword address [%rs1]%asi. If the values are equal the value in %rd is swapped with the contents of the memory doubleword pointed to by the address [%rs1]%asi. If the values are not equal, the memory location remains unchanged but the memory doubleword pointed to by [%rs1]%asi replaces the value in %rd. The instruction operates atomically and the atomicity is maintained in the same manner as instruction CASA(i=0) as described previously herein. The compare-and-swap operation functions as a store, operation, either of a new value from %rd or of the previous value in memory. The addressed location must be writable even if the values in memory and %rs2 are not equal.) Table 12A illustrates an example of a format of CASXA(i=1) instruction according to an embodiment of the present invention.

TABLE 12A

An example of CASXA(i=1) instruction format.

| 31-30 | 29-25 | 24---19 | 18-14 | 13 | 12------5 | 4--0 |
|---|---|---|---|---|---|---|
| 11 | rd %o0 | 111110 | rs1 [addr]i%asi | 1 | — | rs2 %i1 |

Helpers for CASXA(i=1)

According to an embodiment of the present invention, CASXA(i=1) instruction includes six helpers. However, one skilled in the art will appreciate that complex instructions can include various numbers of helper instructions according to the architecture of the target processor (e.g., cycle time, internal and external resources used for the instruction, performance requirements or the like).

1) H_OR %g0, %o0, %tmp2

When issued, the helper results in writing the value in %o0 into its corresponding entry i.e., the entry to which %tmp2 gets renamed to in IWRF. The helper functions as NOP upon retirement i.e., it does not write the value in IWRF into IARF because %tmp2 is used to provide dependency and is not part of IARF. Table 12B illustrates an example of a format of helper H_OR according to an embodiment of the present invention.

TABLE 12B

The format of helper H_OR.

| 31-30 | 29---25 | 24---19 | 18-14 | 13 | 12----5 | 4---0 |
|---|---|---|---|---|---|---|
| 10 | rd | 000010 | rs1 | 0 | C | rs2 |
|  | %tmp2 |  | %g0 |  |  | %o0 |

Where 'C' represents a copy of incoming bit or field (i.e. the copy of complex instruction).

2) H_LDXA [addr]%asi, %tmp1

When issued, thte helper copies a doubleword from the addressed memory location [addr]%asi (i.e., ([%i0]+sign_ext(simm13))%asi)into its corresponding entry i.e., the entry to which %tmp1 gets renamed to in IWRF. The helper functions as NOP i.e., it does not write the value in IWRF into IARF because %tmp1 is used only to provide dependency and is not part of IARF. Table 12C illustrates an example of a format of helper H_LDXA according to an embodiment of the present invention.

TABLE 12C

The format of helper H_LDXA.

| 31-30 | 29----25 | 24---19 | 18-14 | 13--------------------0 |
|---|---|---|---|---|
| 11 | rd | 011011 | rs1 | C 0 0000 0000 0000 |
|  | %tmp1 |  | %i0 |  |

Where 'C' represents a copy of incoming bit or field (i.e. the copy of complex instruction).

3) H_SUBcc %tmp1, %i1, %g0

When issued, the helper compares the value in %tmp1 i.e., 64-bit data stored in one of the entries of IWRF to which %tmp1 is renamed to, and %i1 and writes the difference into its corresponding entry in IWRF i.e., the entry to which %g0 gets renamed to. It also modifies temporary condition codes (both icc and xcc portion of it) by writing the modified value (8-bit value, {xcc[3:0], icc[3:0]}) into its corresponding entry in CWRF (i.e., the entry to which %tmpcc (temporary condition code register) gets renamed to). The helper functions as NOP upon retirement i.e., it does not write the value in IWRF into IARF because %g0 is read only register and is used only to satisfy instruction format and the helper also does not write the value in CWRF into CARF because reason being %tmpcc is used only to provide dependency and is not part of CARF. This helper does not result in any exceptions. Table 12D illustrates an example of a format of helper H_SUBcc according to an embodiment of the present invention.

TABLE 12D

The format of helper H_SUBcc.

| 31-30 | 29-25 | 24---19 | 18----14 | 13 | 12-----5 | 4--0 |
|---|---|---|---|---|---|---|
| 10 | rd | 010100 | rs1 | 0 | C | rs2 |
|  | %g0 |  | %tmp1 |  |  | %i1 |

Where 'C' represents a copy of incoming bit or field (i.e. the copy of complex instruction).

4) H_MOVNE %tmp1, %tmp2

When this helper is issued, the helper determines the value of tmpcc (in the present case, tmpicc.Z) and if (tmpicc.Z=0) the contents of %tmp 1 are written into %tmp2, if (tmpicc.Z=1) then the contents of %tmp2 remains unchanged. The helper functions as NOP upon retirement i.e., it does not write the value in IWRF into IARF. Table 12E illustrates an example of a format of helper H_MOVNE according to an embodiment of the present invention.

TABLE 12E

The format of helper H_MOVNE.

| 31-30 | 29----25 | 24----19 | 18 | 17--14 | 13 | 12 | 11 | 10-----5 | 4-----0 |
|---|---|---|---|---|---|---|---|---|---|
| 10 | rd | 101100 | 1 | 1000 | 0 | 1 | 0 | C | rs2 |
|  | %tmp2 |  |  |  |  |  |  |  | %tmp1 |

Where 'C' represents a copy of incoming bit or field (i.e. the copy of complex instruction).

5) H_STXA %tmp2, [addr]%asi

When issued, the helper results in storing the lower 32-bits of %tmp2 into memory location identified by the word address [addr]%asi (i.e., ([%i0]+sign_ext(simm13)) imm_asi). Table 12F illustrates an example of a format of helper H_STXA according to an embodiment of the present invention.

TABLE 12F

The format of helper H_STXA.

| 31-30 | 29----25 | 24---19 | 18-14 | 13--------------------0 |
|---|---|---|---|---|
| 11 | rd | 011110 | rs1 | C0 0000 0000 0000 |
|  | %tmp2 |  | %i0 |  |

Where 'C' represents a copy of incoming bit or field (i.e. the copy of complex instruction).

6) H_OR %tmp1, %g0, %o0

When issued, the helper results in writing the value in %tmp1 into its corresponding entry i.e., the entry to which %o0 gets renamed to in IWRF. Upon retirement, the helper writes the value in IWRF into %o0 which is part of IARF. Table 12G illustrates an example of a format of helper H_OR according to an embodiment of the present invention.

TABLE 12G

The format of helper H_OR.

| 31-30 | 29------25 | 24----19 | 18----14 | 13 | 12-----------------5 | 4-------0 |
|---|---|---|---|---|---|---|
| 10 | rd | 000010 | rs1 | 0 | C | rs2 |
|  | %o0 |  | %tmp1 |  |  | %g0 |

Where 'C' represents a copy of incoming bit or field (i.e. the copy of complex instruction).

The above description is intended to describe at least one embodiment of the invention. The above description is not intended to define the scope of the invention. Rather, the scope of the invention is defined in the claims below. Thus, other embodiments of the invention include other variations, modifications, additions, and/or improvements to the above description.

It is to be understood that the architectures depicted herein are merely exemplary, and that in fact many other architectures can be implemented which achieve the same functionality. In an abstract, but still definite sense, any arrangement of components to achieve the same functionality is effectively coupled such that the desired functionality is achieved. Hence, any two components herein combined to achieve a particular functionality can be seen as coupled each other such that the desired functionality is achieved, irrespective of architectures or intermedial components. Likewise, any two components so associated can also be viewed as being operably coupled to each other to achieve the desired functionality.

While particular embodiments of the present invention have been shown and described, it will be clear to those skilled in the art that, based upon the teachings herein, various modifications, alternative constructions, and equivalents may be used without departing from the invention claimed herein. Consequently, the appended claims encompass within their scope all such changes, modifications, etc. as are within the spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

What is claimed is:

1. A method of operating a processor, the method comprising:
    retrieving a plurality of instructions, wherein at least one instruction in the plurality of instructions is a complex instruction; and
    mapping the complex instruction to a set of helper instructions retrievable from a helper store utilizing a vector;
    wherein the set of helper instructions is organized as one or more groups;
    wherein the vector is utilized to address an initial one of the one or more groups in the helper store, and by shifting the vector left or right, each subsequent one of the one or more groups.

2. The method of claim 1, further comprising: upon identifying the complex instruction, stalling subsequent retrieving of the plurality of instructions.

3. The method of claim 2, wherein the stalling is discontinued in response to the set of helper instructions having been forwarded for execution.

4. The method of claim 1, further comprising: forwarding the plurality of instructions for execution, wherein instead of forwarding the complex instruction, the set of helper instructions are forwarded.

5. The method of claim 1, wherein at least one other instruction in the plurality of instructions is a non-complex instruction, the method further comprising forwarding the non-complex instruction and the helper instructions for execution.

6. The method of claim 1, wherein the complex instruction maps to at least two helper instructions.

7. The method of claim 1, wherein each helper instruction in the set of helper instructions is encoded as a non-complex instruction and wherein executing the set of helper instructions accomplishes a function of the complex instruction.

8. The method of claim 1, wherein the set of helper instructions includes one or more non-complex instructions not corresponding to a function of the complex instruction.

9. The method of claim 8, wherein the one or more non-complex instructions include a no-operation instruction.

10. The method of claim 8, wherein the one or more non-complex instructions include a control information instruction.

11. The method of claim 1, wherein the helper store is configured to retrieve at least one of the one or more groups for each vector in one processor cycle.

12. The method of claim 1, wherein each of the one or more groups are organized as three helper instructions.

13. The method of claim 1, wherein each of the one or more groups are organized in the helper store as N helper instructions, wherein N is selected according to a number of instructions that can be retrieved in one processor cycle.

14. The method of claim 1, wherein each one of the one or more groups further includes information bits corresponding to one or more of processor control, instruction order and instruction type.

15. The method of claim 1, wherein the helper store includes a read-only-memory.

16. The method of claim 1, wherein the processor includes an out-of-order processor.

17. The method of claim 1, wherein the processor includes a very long instruction word processor.

18. The method of claim 1, wherein the processor includes a reduced instruction set processor.

19. The method of claim 1, wherein the plurality of instructions includes at least three instructions.

20. The method of claim 1, wherein the plurality of instructions includes N instructions wherein N is selected according to a number of instructions that can be retrieved in one processor cycle.

21. The method of claim 1, wherein the complex instruction is an atomic instruction.

22. The method of claim 1, wherein the vector is shifted left by one bit location to for each subsequent one of the one or more groups to address in the helper store the subsequent one of the one or more groups.

23. The method of claim 1, wherein the vector is shifted left by N bit locations for each subsequent one of the one or more groups to address in the helper store the subsequent one of the one or more groups wherein N is selected according to address encoding of the helper store.

24. The method of claim 1, wherein the vector is shifted right to address in the helper store each subsequent one of the plurality of groups.

25. The method of claim 1, wherein at least one other of the plurality of instructions is another complex instruction, wherein the corresponding set of helper instructions for each of the complex instructions is retrieved according to an order in which the complex instructions were retrieved in the plurality of instructions.

26. A processor comprising:
    a helper instruction store configured to store plural sets of helper instructions, each set organized as one or more groups, each set corresponding to a different complex instruction; and
    a vector generator coupled to the helper instruction store and configured to generate a vector corresponding to a complex instruction to address an initial group in a corresponding set of helper instructions and, by shifting the vector left or right, each subsequent group in the corresponding set of helper instructions.

27. The processor of claim 26, further comprising: at least one instruction decode logic coupled to the vector generator and configured to: retrieve a plurality of instructions; decode the plurality of instructions to identify at least one complex instruction; and upon identifying the at least one complex instruction, stall subsequent retrieving of the plurality of instructions.

28. The processor of claim 27, wherein the stalling is discontinued in response to sets of helper instructions corresponding to each one of the at least one complex instruction having been forwarded for execution.

29. The processor of claim 26, further comprising: a complex instruction decode logic coupled to the helper instruction store and configured to decode at least one complex instruction.

30. The processor of claim 26, wherein the vector generator is configured as bit alignment logic.

31. The processor of claim 26, further comprising: an instruction priority unit coupled to the helper instruction store and configured to: prioritize a plurality of complex instructions according to an order in which the plurality of complex instructions are retrieved in a plurality of instructions; and generate a bit address encoding to address a corresponding set of helper instructions in the helper instruction store, the corresponding set of helper instructions corresponding to a highest priority complex instruction of the plurality of complex instructions.

32. The processor of claim 26, wherein the vector represents word address encoding for the helper instruction store.

33. The processor of claim 26, wherein the helper store is configured to: release at least one group of helper instructions in one processor cycle for each vector.

34. The processor of claim 26, wherein each group in the one or more groups are organized as three helper instructions in the helper instruction store.

35. The processor of claim 26, wherein each group in the one or more groups are organized as N helper instructions in the helper instruction store wherein N is selected according to a number of instructions that can be fetched in one cycle by the processor.

36. The processor of claim 26, wherein each group in the one or more groups includes information bits corresponding to one or more of processor control, instruction order and instruction type for each one of the helper instructions in the group.

37. The processor of claim 26, wherein the helper store includes a read-only-memory.

38. The processor of claim 26, wherein the processor includes an out-of-order processor.

39. The processor of claim 26, wherein the processor includes a very long instruction word processor.

40. The processor of claim 26, wherein the processor includes a reduced instruction set processor.

41. The processor of claim 26, wherein the vector generator is configured to: for each subsequent one of the one or more groups, shift the vector left by one bit location to address the subsequent one of the one or more groups in the helper store.

42. The processor of claim 26, wherein the vector generator is configured to: for each subsequent one of the one or more groups, shift the vector left by N bit locations to address the subsequent one of the one or more groups in the helper store wherein N is selected according to an address encoding of the helper instruction store.

43. The processor of claim 26, wherein the vector generator is configured to: shift the vector night to address each subsequent one of the one or more groups in the helper store.

44. A processor comprising: means for retrieving a plurality of instructions, wherein at least one instruction in the plurality of instructions is a complex instruction; and means for mapping the complex instruction to a set of helper instructions retrievable from a helper store utilizing a vector, wherein the set of helper instructions is organized as one or more groups, and wherein the vector is utilized to address an initial one of the one or more groups in the helper store, and by shifting the vector left or right, each subsequent one of the one or more groups.

45. The processor of claim 44, further comprising: upon identifying the complex instruction, means for stalling subsequent retrieving of the plurality of instructions until the set of helper instructions are forwarded for execution.

46. The processor of claim 44, further comprising: means for forwarding the plurality of instructions for execution, wherein instead of forwarding the complex instruction, the set of helper instructions are forwarded.

47. The processor of claim 44, further comprising: an instruction priority unit coupled to the helper instruction store comprising: means for prioritizing a plurality of complex instructions according to an order in which the plurality of complex instructions are retrieved in a plurality of instructions; and means for generating a bit address encoding to address a corresponding set of helper instructions in the helper instruction store, the corresponding set of helper instructions corresponding to a highest priority complex instruction of the plurality of complex instructions.

48. The processor of claim 44, further comprising: releasing at least one group of helper instructions in one processor cycle for each vector.

49. A processor that decodes a plurality of complex instructions and substitutes, for at least some of the plurality of complex instructions, helper instructions retrieved from a helper store, wherein the helper instructions are organized as one or more groups and a vector is utilized to address an initial one of the one or more groups in the helper store, and by shifting the vector left or right, each subsequent one of the one or more groups.

50. The method of claim 1, wherein the set of helper instructions is organized as a plurality of groups.

51. The processor of claim 26, wherein at least one of the sets of helper instructions is organized as a plurality of groups.

52. The processor of claim 44, wherein the set of helper instructions is organized as a plurality of groups.

53. The processor of claim 49, wherein the helper instructions are organized as a plurality of groups.

* * * * *

UNITED STATES PATENT AND TRADEMARK OFFICE
CERTIFICATE OF CORRECTION

| | |
|---|---|
| PATENT NO. | : 7,219,218 B2 |
| APPLICATION NO. | : 10/403530 |
| DATED | : May 15, 2007 |
| INVENTOR(S) | : Thimmannagari et al. |

It is certified that error appears in the above-identified patent and that said Letters Patent is hereby corrected as shown below:

In column 7, line 25, delete "310(l)–(n)" and insert -- 310(1)–(n) --, therefor.

In column 8, line 1, delete "TABLE 1" and insert -- TABLE 1A --, therefor.

In column 8, line 20, delete "I0_cmpls_0" and insert -- I0_cmplx_0 --, therefor.

In column 29, lines 51-53, above "TABLE 5D" insert -- 3) H_STB %tmp1, [addr] When issued, this helper stores the addressed memory location [addr] with all 1's. Table 5C illustrates an example of a format of helper H_STB according to an embodiment of the present invention. --.

In column 31, lines 21-22, delete "TABLE 5B" and insert -- TABLE 6B --, therefor.

In column 33, line 47, delete "([rsl]" and insert -- ([rs1] --, therefor.

In column 33, line 48, delete "([rsl]" and insert -- ([rs1] --, therefor.

In column 36, line 11, delete "[addr]imm asi," and insert -- [addr]imm_asi, --, therefor.

In column 38, line 1, delete "TABLE 10A" and insert -- TABLE 11A --, therefor.

In column 40, line 17, delete "imm asi." and insert -- imm_asi. --, therefor.

In column 42, line 36, after "Space" insert -- , --.

In column 43, line 27, delete "thte" and insert -- the --, therefor.

In column 46, line 43, in Claim 22, after "location" delete "to".

UNITED STATES PATENT AND TRADEMARK OFFICE
CERTIFICATE OF CORRECTION

PATENT NO. : 7,219,218 B2
APPLICATION NO. : 10/403530
DATED : May 15, 2007
INVENTOR(S) : Thimmannagari et al.

It is certified that error appears in the above-identified patent and that said Letters Patent is hereby corrected as shown below:

In column 48, line 8, in Claim 43, delete "night" and insert -- right --, therefor.

Signed and Sealed this

Twenty-sixth Day of June, 2007

JON W. DUDAS
*Director of the United States Patent and Trademark Office*